US006809168B2

(12) United States Patent
Agarwal et al.

(10) Patent No.: US 6,809,168 B2
(45) Date of Patent: Oct. 26, 2004

(54) ARTICLES FORMED FROM PROPYLENE DIENE COPOLYMERS

(75) Inventors: Pawan Kumar Agarwal, Houston, TX (US); Weiqing Weng, Houston, TX (US); Aspy K. Mehta, Humble, TX (US); Armenag H. Dekmezian, Kingwood, TX (US); Main Chang, Houston, TX (US); Rajan K. Chudgar, League City, TX (US); Olivier Jean Georjon, Brussels (BE); Chon-Yie Lin, Houston, TX (US); Michael C. Chen, Bellaire, TX (US); Galen C. Richeson, Kingwood, TX (US); Palanisamy Arjunan, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/406,036

(22) Filed: Apr. 2, 2003

(65) Prior Publication Data

US 2004/0087749 A1 May 6, 2004

Related U.S. Application Data

(63) Continuation-in-part of application No. 09/788,811, filed on Feb. 20, 2001, now abandoned, which is a continuation-in-part of application No. 09/458,281, filed on Dec. 10, 1999, now abandoned, and a continuation-in-part of application No. 09/734,479, filed on Dec. 11, 2000, now abandoned, which is a continuation-in-part of application No. PCT/US00/33612, filed on Dec. 11, 2000.

(51) Int. Cl.$^7$ .............................................. C08F 236/20
(52) U.S. Cl. .................... 526/336; 526/126; 526/127; 526/131; 526/134; 526/160; 526/165; 526/339
(58) Field of Search ................................ 526/336, 339, 526/126, 127, 131, 134, 160, 165

(56) References Cited

U.S. PATENT DOCUMENTS

| | | | |
|---|---|---|---|
| 3,351,621 | A | 11/1967 | Bacskai |
| 4,182,810 | A | 1/1980 | Willcox |
| 4,530,914 | A | 7/1985 | Ewen et al. |
| 4,542,199 | A | 9/1985 | Kaminsky et al. |
| 4,665,208 | A | 5/1987 | Welborn, Jr. et al. |
| 4,808,561 | A | 2/1989 | Welborn, Jr. |
| 4,871,705 | A | 10/1989 | Hoel |
| 4,874,734 | A | 10/1989 | Kioka et al. |
| 4,908,463 | A | 3/1990 | Bottelberghe |
| 4,921,825 | A | 5/1990 | Kioka et al. |
| 4,923,833 | A | 5/1990 | Kioka et al. |
| 4,924,018 | A | 5/1990 | Bottelberghe |
| 4,933,403 | A | 6/1990 | Kaminsky et al. |
| 4,937,299 | A | 6/1990 | Ewen et al. |
| 4,948,840 | A | 8/1990 | Berta |
| 4,952,540 | A | 8/1990 | Kioka et al. |
| 4,968,827 | A | 11/1990 | Davis |
| 5,017,714 | A | 5/1991 | Welborn, Jr. |
| 5,026,798 | A | 6/1991 | Canich |
| 5,047,485 | A | 9/1991 | DeNicola, Jr. |

(List continued on next page.)

FOREIGN PATENT DOCUMENTS

| | | |
|---|---|---|
| DE | 196 03 438 | 8/1997 |
| DE | 196 03 439 | 8/1997 |
| DE | 196 03 600 | 8/1997 |
| EP | 0 279 586 B | 8/1988 |
| EP | 0 449 087 A | 10/1991 |
| EP | 0 279 863 B | 10/1992 |
| EP | 0 549 900 B | 7/1993 |
| EP | 0 561 476 A | 9/1993 |
| EP | 0 576 970 B | 1/1994 |
| EP | 0 594 218 B | 4/1994 |
| EP | 0 354 893 B | 11/1994 |
| EP | 0 784 062 | 7/1997 |
| EP | 0 942 017 | 9/1999 |
| EP | 1 008 607 | 6/2000 |
| WO | WO 91/09882 | 7/1991 |
| WO | WO 91/17194 | 11/1991 |
| WO | WO 93/14132 | 7/1993 |
| WO | WO 94/03506 | 2/1994 |
| WO | WO 94/10180 | 5/1994 |
| WO | WO 94/21962 | 9/1994 |
| WO | WO 97/36741 | 10/1997 |
| WO | WO 98/49229 | 11/1998 |
| WO | WO 99/11680 | 11/1999 |

OTHER PUBLICATIONS

Japanese Patent JP 05 194659 A2 (Aug. 3, 1993) Derwent Abstract, "Olefin copolymers with high melt tension and manufacture thereof"—Shinozaki et al.,—Mitsui Petrochemical, Japan.

Japanese Patent JP 06 093041 A2 (Apr. 5, 1994) Derwent Abstract,, "Manufacture of reactive propylene random copolymers free from boiling xylene–insoluble components"—Goto et al.—Mitsubishi Petrochemical, Japan.

(List continued on next page.)

Primary Examiner—Caixia Lu
(74) Attorney, Agent, or Firm—Catherine Bell; Leandro Arechederra

(57) ABSTRACT

The co-polymerization reaction of one or more olefin monomers, such as propylene, with α,ω-diene units and the resulting copolymers are provided. More specifically, the copolymer may have from 90 to 99.999 weight percent of olefins and from 0.001 to 2.000 weight percent of α,ω-dienes. The copolymer may have a weight average molecular weight in the range from 50,000 to 2,000,000, a crystallization temperature in the range from 115° C. to 135° C. and a melt flow rate in the range from 0.1 dg/min to 100 dg/min. These copolymers may be employed in a wide variety of applications, the articles of which include, for example, films, fibers, such as spunbonded and meltblown fibers, fabrics, such as nonwoven fabrics, and molded articles. The copolymer may further include at least two crystalline populations. Desirably, the melting point range of one of the crystalline populations is distinguishable from the melting point range of another crystalline population by a temperature range of from 1° C. to 8° C. More desirably, one of the crystalline populations has a melting point in the range from 152° C. to 158° C. and another crystalline population has a melting point in the range from 142° C. to 148° C.

62 Claims, 17 Drawing Sheets

U.S. PATENT DOCUMENTS

| | | | |
|---|---|---|---|
| 5,057,475 | A | 10/1991 | Canich et al. |
| 5,091,352 | A | 2/1992 | Kioka et al. |
| 5,103,031 | A | 4/1992 | Smith, Jr. |
| 5,120,867 | A | 6/1992 | Welborn, Jr. |
| 5,145,819 | A | 9/1992 | Winter et al. |
| 5,153,157 | A | 10/1992 | Hlatky et al. |
| 5,198,401 | A | 3/1993 | Turner et al. |
| 5,204,419 | A | 4/1993 | Tsutsui et al. |
| 5,206,199 | A | 4/1993 | Kioka et al. |
| 5,235,081 | A | 8/1993 | Sangokoya |
| 5,239,022 | A | 8/1993 | Winter et al. |
| 5,243,001 | A | 9/1993 | Winter et al. |
| 5,248,801 | A | 9/1993 | Sangokoya |
| 5,262,503 | A | 11/1993 | Gotoh |
| 5,274,056 | A | 12/1993 | McDaniel et al. |
| 5,276,208 | A | 1/1994 | Winter et al. |
| 5,278,119 | A | 1/1994 | Turner et al. |
| 5,296,434 | A | 3/1994 | Karl et al. |
| 5,304,614 | A | 4/1994 | Winter et al. |
| 5,308,815 | A | 5/1994 | Sangokoya |
| 5,324,800 | A | 6/1994 | Welborn, Jr. et al. |
| 5,329,032 | A | 7/1994 | Tran et al. |
| 5,329,033 | A | 7/1994 | Spaleck et al. |
| 5,350,723 | A | 9/1994 | Neithamer et al. |
| 5,374,752 | A | 12/1994 | Winter et al. |
| 5,391,790 | A | 2/1995 | Rohrmann et al. |
| 5,416,169 | A | 5/1995 | Saito et al. |
| 5,504,171 | A | 4/1996 | Etherton et al. |
| 5,510,502 | A | 4/1996 | Sugano et al. |
| 5,514,761 | A | 5/1996 | Etherton et al. |
| 5,541,236 | A | 7/1996 | DeNicola, Jr. et al. |
| 5,610,254 | A | 3/1997 | Sagane et al. |
| 5,643,847 | A | 7/1997 | Walzer, Jr. |
| 5,670,595 | A | 9/1997 | Meka et al. |
| 5,672,668 | A | 9/1997 | Winter et al. |
| 5,756,587 | A | 5/1998 | Bettonville et al. |
| 5,986,009 | A | 11/1999 | Thoen et al. |

OTHER PUBLICATIONS

Japanese Patent JP 06 093042 A2 (Apr. 5, 1994) Derwent Abstract, "Catalysts and manufacture of propylene random copolymers"—Futamura et al.,—Mitsubishi Petrochemical, Japan.

Japanese Patent JP 07 133387 A2 (May 23, 1995) Derwent Abstract, "Propylene polymer compositions with balanced rigidity and impact resistance"—Sugimoto et al.,—Mitsui Toatsu Chemicals, Japan.

Japanese Patent JP 07 138424 A2 (May 30, 1995) Derwent Abstract, "Propylene polymer compositions with balanced rigidity"—Sugimoto et al.,—Mitsui Toatsu Chemicals, Japan.

Japanese Patent JP 07165814 A2 (Jun. 27, 1995) Derwent Abstract, "Propylene–Alpha–Omega–Diene Copolymers and Method for Their Manufacture"—Sugimoto et al.,—Mitsui Toatsu Chemicals, Japan.

Japanese Patent JP 07 179687 A2 (Jul. 18, 1995) Derwent Abstract, "Propylene polymer compositions with good rigidity and impact resistance"—Sugimoto et al.,—Mitsui Toatsu Chemicals, Japan.

Japanese Patent JP 08 092308 A2 (Apr. 9, 1996) Derwent Abstract, "Manufacture of polyolefins with High melting point and stereoregularity"—Sataka et al., Showa Denko KK, Japan.

*Kirk–Othmer Encyclopedia of Chemical Technology*, Fourth Edition, v. 11, pp. 730–783—"Foamed Plastics" .

*Kirk–Othmer Encyclopedia of Chemical Technology*, Fourth Edition, v. 17, pp. 784–819—"Polypropylene" .

Naofumi Naga et al., "Copolymerization of Propene and Nonconjugated Diene Involving Intramolecular Cyclization with Metallocene/Methylaluminoxane"—*Macromolecules* 1999, v.32. pp. 1348–1355.

Wild et al., "*ansa*–Metallocene Derivatives–VII, Synthesis and Crystal Structure of a Chiral ansa–Zirconocene Derivative with Ethylene–Bridged Tetrahydroindenyl Ligands" *Journal of Organometallic Chemistry*, v.288 (1985) pp. 63–67.

Example 10

Example 7

Commercial Product
PF-814

Example 4

Commercial Product
PF-814

ARTICLES FORMED FROM PROPYLENE DIENE COPOLYMERS

RELATED PATENT APPLICATIONS

The present invention is a continuation in part of U.S. Ser. No. 09/788,811, filed Feb. 20, 2001 (now abandoned), which is a continuation in part of U.S. Ser. No. 09/458,281 filed Dec. 10, 1999 (now abandoned), and is a continuation-in-part of U.S. Ser. No. 09/734,479, filed Dec. 11, 2000 (now abandoned), which is a continuation-in-part of PCT/US00/33612, filed Dec. 11, 2000.

This patent application also relates to co-pending patent applications U.S. Ser. No. 09/788, 810 and U.S. Ser. No. 09/458,918.

FIELD

The present invention relates to propylene copolymers. More particularly the invention relates to copolymers formed from the copolymerization of propylene and diene monomers and articles produced therefrom.

BACKGROUND

Polypropylene is an inexpensive thermoplastic polymer employed in a wide variety of applications, the articles of which include, for example, films, fibers, such as spunbonded and melt blown fibers, fabrics, such as nonwoven fabrics, and molded articles. The selection of polypropylene for any one particular application depends, in part, on the physical and mechanical properties of the polypropylene polymer candidate as well as the article fabrication mode or manufacturing process. Examples of physical properties include density, molecular weight, molecular weight distribution, melting temperature and crystallization temperature. Examples of mechanical properties include heat distortion temperature (HDT) and Flexural Modulus. Examples of factors relevant to the processing environment include the melt flow rate (MFR), cycle time, bubble stability, sag resistance, melt strength and shear/elongational viscosity.

In some instances articles formed from polypropylene, for example, via an injection molding process, may require a high degree of structural rigidity. This structural rigidity may be directly correlated with the value of modulus (e.g. flexural modulus), such that to achieve high structural rigidity in a molded article, polymers exhibiting high modulus values are desirable. Additionally, for such articles to be economically manufactured, the fabrication mode must be capable of producing the article at a selected rate, also referred to as "cycle time". The cycle time for injection molding may generally be described as the duration from the introduction of molten polymer into the mold to the release of the molded article from the mold. The cycle time is a function of the viscosity of the molten polymer. Cycle time also relates to the crystallization temperature of the polymer. Generally, the crystallization temperature is the pivotal temperature at which the molten liquid polymer hardens. This hardening is due, in part, to the formation of crystalline structures within the polymer. It follows that as the molten polymer cools in the mold, molten polymers having higher crystallization temperatures will form crystalline structures sooner than polymers having lower crystallization temperatures. As such, shorter cycle times may be achieved by using polymers with higher crystallization temperatures. It will be understood from this that many variables may be relevant and require consideration before selecting a polymer for a particular application.

As the criteria for polymer applications and articles formed therefrom continue to evolve, there remains a need to continually modify and improve the physical, mechanical and rheological properties of polymers, and in particular polypropylene polymers, to meet these evolving criteria.

SUMMARY

The present invention involves the reaction, and particularly a copolymerization reaction, of olefin monomers, wherein one such olefin monomer is desirably propylene, with an $\alpha,\omega$-diene and the olefin/$\alpha,\omega$-diene copolymers resulting form that reaction. Additionally, the present invention involves a copolymerization reaction of olefin monomers, wherein the reaction includes propylene and ethylene copolymerization with an $\alpha,\omega$-diene and the copolymers that are made. These copolymers may be employed in a variety of articles including include, for example, films, fibers, such as spunbonded and melt blown fibers, fabrics, such as nonwoven fabrics, and molded articles. More particularly, these articles include, for example, cast films, oriented films, injection molded articles, blow molded articles, foamed articles, foam laminates and thermoformed articles.

It should be noted that while linear $\alpha,\omega$-dienes are preferred, other dienes can also be employed to make polymers of this invention. These would include branched, substituted $\alpha,\omega$-dienes, such as 2-methyl-1,9-decadiene; cyclic dienes, such as vinylnorbornene; or aromatic types, such as divinyl benzene.

Embodiments of the present invention include copolymers having from 98 to 99.999 weight percent olefin units, and from 0.001 to 2.000 weight percent $\alpha,\omega$-diene units. Copolymer embodiments may have a weight average molecular weight from 50,000 to 2,000,000, crystallization temperatures from 115° C. to 135° C. and a melt flow rate (MFR) from 0.1 dg/min to 100 dg/min. Note that the invention polymers display these high crystallization temperatures intrinsically; there is no need for externally added nucleating agents. The copolymer may further include at least two crystalline populations. Some embodiments have melting point ranges for one crystalline population that are distinguishable from the melting point range of another crystalline population. The difference in melting point range can be from 1° C. to 16° C. This represents the difference between the melting points of the two crystalline populations. In other embodiments, one of the crystalline populations has a melting point from 152° C. to 158° C. and another crystalline population has a melting point from 142° C. to 148° C.

In other embodiments, the copolymer includes from 90 to 99.999 weight percent of propylene units, from 0.00 to 8 weight percent of olefin units other than propylene units and from 0.001 to 2.000 weight percent $\alpha,\omega$-diene units. Copolymer embodiments may have weight average molecular weights from 50,000 to 2,000,000, crystallization temperatures (without the addition of external nucleating agents) from 115° C. to 135° C. and MFRs from 0.1 dg/min to 100 dg/min. The olefin may be any of $C_2$–$C_{20}$ $\alpha$-olefins, diolefins (with one internal olefin) and their mixtures thereof. More specifically, olefins include ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene. The copolymer may further include at least two crystalline populations. These embodiments have melting point ranges for one of the crystalline populations that are distinguishable from the melting point range of another crystalline population by a temperature range of from 1° C. to 16° C. More desirably, one of the crystalline populations has a melting point in the range from 152° C. to 158° C. and another crystalline population has a melting point in the range from 142° C. to 148° C.

DETAILED DESCRIPTION

Figure 1:
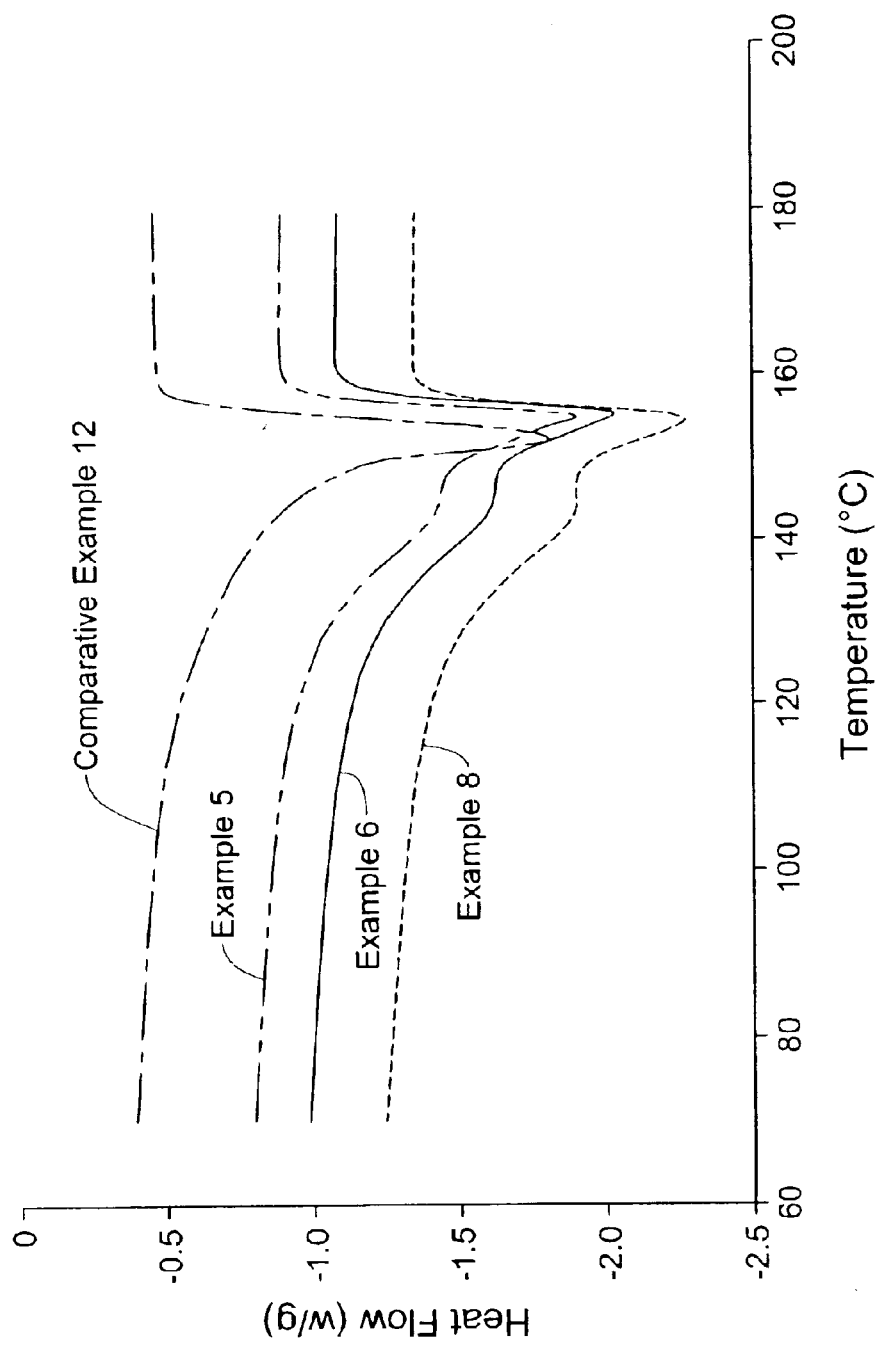
FIG. 1 is a graph illustrating the melting and crystallization curves of copolymers formed in Examples 5, 6, and 8 and a comparative polymer formed in Example 12.

Ranges are used throughout the description of the invention to further define the invention. Unless otherwise stated, it will be understood that these ranges include the recited end point value(s) as well as those values defined by and/or between the recited end point value(s). Moreover, a range recitation covers all values outside of the recited range, but functionally equivalent to values within the range.

In the description of the copolymer, and particularly when describing the constituents of the copolymer, in some instances, monomer terminology may be used. For example, terms such as "olefin", "propylene", "$\alpha,\omega$-diene", "ethylene" and other $\alpha$-olefins can be used. When such monomer terminology is used to describe the copolymer constituents, it means the polymerized units of such monomers present in the copolymer.

The copolymer includes a copolymerization reaction product, and desirably a metallocene-based copolymerization reaction product, of one or more olefin monomers, in which one such olefin monomer is propylene, and one or more $\alpha,\omega$-diene monomers. Desirably, the copolymer includes a copolymerization reaction product, and desirably a metallocene-based copolymerization reaction product, of two or more olefin monomers, in which the olefin monomers are $\alpha$-olefin monomers, particularly propylene and ethylene monomers, with one or more $\alpha,\omega$-diene monomers.

Generally, olefins are present in the copolymer at from 98 to 99.999 wt %. In most embodiments, the $\alpha,\omega$-diene content of the copolymer is greater than or equal to 0.001 wt % up to and including 2 wt %. But specific embodiments can have a variety of $\alpha,\omega$-diene content. For example, embodiments with minimum diene contents of 0.003 and 0.005 wt % are within the invention's scope. Similarly, embodiments with maximum diene contents of 1 and 1.5 wt % are also within the invention's scope.

Some embodiments that have two or more different olefin units have propylene olefin units, which may be present in the copolymer in the range from 90.05 wt % to 99.999 wt % of the copolymer. These embodiments additionally have other olefin units such as ethylene. These embodiments typically have other-olefin content from 0.05 to 8 wt %. But specific embodiments have other-olefin content minimums of 0.1 wt % and 0.5 wt %. Similarly, other specific embodiments have other-olefin content maximums 6 wt % and 3 wt % of the copolymer. $\alpha,\omega$-diene(s) typically are present at from 0.001 wt % to 2 wt % of the copolymer. But specific embodiments have $\alpha,\omega$-diene(s) content minimums of from 0.003 wt % and from 0.005 wt %. Similarly, other embodiments have $\alpha,\omega$-diene(s) content maximums of 1.5 wt % and 1.0 wt % of the copolymer Still more desirably, the copolymer includes: propylene units in the range from 90 wt % to 99.999 wt % of the copolymer; $C_2$ or other $\alpha$-olefin(s) units in the range from 0.00 wt % to 8 wt %, desirably in the range from 0.1 to 6 wt % and more desirably in the range from 0.5 wt % to 3 wt % of the copolymer; the $\alpha,\omega$-diene(s) units are present in the copolymer in the range from 0.001 wt % to 2 wt %, desirably in the range from 0.003 wt % to 1.5 wt % and more desirably in the range from 0.005 wt % to 1.0 wt % of the copolymer.

The copolymer has a weight average molecular weight in the range from 50,000 to 2,000,000, desirably from 70,000 to 1,000,000 and even more desirably from 100,000 to 750,000. The copolymer has a molecular weight distribution (MWD) in the range from 2 to 15, desirably from 2 to 10 and even more desirably from 2 to 8.

The copolymer has a crystallization temperature (without externally added nucleating agents) in the range from 115° C. to 135° C., and desirably from greater than 115° C. to 130° C., and more desirably from 118° C. to 126° C. The copolymer may further include at least two crystalline populations. Desirably, the melting point range of one of the crystalline populations is distinguishable from the melting point range of another crystalline population by a temperature range of from 1° C. to 16° C. More desirably, one of the crystalline populations has a melting point in the range from 152° C. to 158° C. and another crystalline population has a melting point in the range from 142° C. to 148° C.

The copolymer may have a melt flow rate (MFR) in the range of from 0.1 dg/min to 100 dg/min, desirably from 0.5 dg/min to 50 dg/min, even more desirably from 1.0 dg/min to 35 dg/min. MFR is determined according to ASTM D-1238, condition L (2.16 kg, 230° C.). The melting point of the copolymer may be less than 165° C., and desirably less than 160° C. Upper limits for melting point depend on the catalyst and polymerization details but would typically not be higher than 165° C. The hexane extractable level (as measured by 21 CFR 177.1520(d)(3)(i)) of the copolymer may be less than 2.0 wt %, and desirably less than 1.0 wt %.

The copolymer desirably has a ratio of extensional viscosity at break to linear viscosity of at least 2.5, desirably of at least 3.0 and more desirably of at least 3.5 at strain rates from 0.1 second$^{-1}$ to 1.0 second$^{-1}$.

The copolymer may include blends, including reactor blends with α-olefins, particularly homopolymers. A typical reactor blend with linear polypropylene and particularly metallocene catalyzed polypropylene is representative.

The copolymer may further be described as "branched". As used herein, the term "branched" means one or more α,ω-diene unit linkages, desirably the α,ω positions of the α,ω-diene unit, between two or more polymer chains formed by the polymerization of one or more α-olefins.

The copolymer may be blended with other polymers, particularly with other polyolefins, both in-reactor as well as externally. Specific examples of such polyolefins include, but are not limited to ethylene-propylene rubber, ethylene-propylene diene rubber, and ethylene plastomers. Specific examples of commercially available ethylene plastomers include EXACT™ resins, products of ExxonMobil Chemical Company and, AFFINITY™ resins and ENGAGE™ resins, products of Dow Chemical Company. Reactor blends with ethylene and/or propylene-based plastomers or elastomers are also within the scope of the invention.

These copolymers may be employed in a wide variety of applications, the articles of which include, for example, films, fibers, such as spunbonded and melt blown fibers, fabrics, such as nonwoven fabrics, and molded articles. More particularly, these articles include, for example, cast films, oriented films, injection molded articles, blow molded articles, foamed articles, foam laminates and thermoformed articles.

Olefins

Olefins (polymerizable reactants) suitable for use include ethylene, $C_3$–$C_{20}$ α-olefins or diolefins (with one of the olefinic functionalities being internal). Examples of α-olefins include, for example, propylene, butene-1, pentene-1, hexene-1, heptene-1,4-methyl-1-pentene, 4-methyl-1-hexene, 5-methyl-1-hexene, 1-octene, 1-decene, 1-undecene, 1-dodecene and the like. In addition, mixtures of these and other α-olefins may also be used, such as, for example, propylene and ethylene as well as monomer combinations from which elastomers are formed. Ethylene, propylene, styrene and butene-1 from which crystallizable polyolefins may be formed are particularly desirable.

Dienes

Examples of suitable α,ω-dienes include α,ω-dienes that contain at least 7 carbon atoms and have up to about 30 carbon atoms, more suitably are α,ω-dienes that contain from 8 to 12 carbon atoms. Representative examples of such α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Of these, 1,7-octadiene, and 1,9-decadiene are more desirable; particularly desirable is 1,9-decadiene. The diene content can be estimated, for example, by measuring absorbence at 722 cm$^{-1}$ using infrared spectroscopy. Branched, substituted α,ω-dienes, for example 2-methyl-1,9-decadiene, 2-methyl-1,7-octadiene, 3,4-dimethyl-1,6-heptadiene, 4-ethyl-1,7-octadiene, or 3-ethyl-4-methyl-5-propyl-1,10-undecadiene are also envisioned.

Note that while α,ω-dienes are preferred, other dienes can also be employed to make polymers of this invention. These would include cyclic dienes, such as vinylnorbornene, or aromatic types, such as divinyl benzene.

Catalyst Composition

Metallocenes: As used herein "metallocene" and "metallocene component" refer generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Methods for preparing metallocenes are fully described in the *Journal of Organometallic Chem.*, volume 288, (1985), pages 63–67, and in EP-A-320762, both of which are herein fully incorporated by reference.

Metallocene catalyst components are described in detail in U.S. Pat. Nos. 5,145,819; 5,243,001; 5,239,022; 5,329,033; 5,296,434; 5,276,208; 5,672,668; 5,304,614; 5,374,752; 5,240,217; 5,510,502 and 5,643,847; and EP 549 900 and 576 970 all of which are herein fully incorporated by reference.

Illustrative but non-limiting examples of desirable metallocenes include:
Dimethylsilanylbis(2-methyl-4-phenyl-1-indenyl)ZrCl$_2$;
Dimethylsilanylbis(2-methyl-4,6-diisopropylindenyl)ZrCl$_2$;
Dimethylsilanylbis(2-ethyl-4-phenyl-1-indenyl)ZrCl$_2$;
Dimethylsilanylbis(2-ethyl-4-naphthyl-1-indenyl)ZrCl$_2$,
Phenyl(Methyl)silanylbis(2-methyl-4-phenyl-1-indenyl) ZrCl$_2$,
Dimethylsilanylbis(2-methyl-4-(1-naphthyl)-1-indenyl) ZrCl$_2$,
Dimethylsilanylbis(2-methyl-4-(2-naphthyl)-1-indenyl) ZrCl$_2$,
Dimethylsilanylbis(2-methyl-indenyl)ZrCl$_2$,
Dimethylsilanylbis(2-methyl-4,5-diisopropyl-1-indenyl) ZrCl$_2$,
Dimethylsilanylbis(2,4,6-trimethyl-1-indenyl)ZrCl$_2$,
Phenyl(Methyl)silanylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl4,6-diisopropyl-1-indenyl)ZrCl$_2$,
Dimethylsilanylbis(2-methyl-4-ethyl-1-indenyl)ZrCl$_2$,
Dimethylsilanylbis(2-methyl-4-isopropyl-1-indenyl)ZrCl$_2$,
Dimethylsilanylbis(2-methyl4-t-butyl-1-indenyl)ZrCl$_2$,
Phenyl(Methyl)silanylbis(2-methyl-4-isopropyl-1-indenyl) ZrCl$_2$,
Dimethylsilanylbis(2-ethyl-4-methyl-1-indenyl)ZrCl$_2$,
Dimethylsilanylbis(2,4-dimethyl-1-indenyl)ZrCl$_2$,
Dimethylsilanylbis(2-methyl-4-ethyl-1-indenyl)ZrCl$_2$,
Dimethylsilanylbis(2-methyl-1-indenyl)ZrCl$_2$, Activators: Metallocenes are generally used in combination with some form of activator. Alkylalumoxanes may be used as activators, most desirably methylalumoxane (MAO). There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO94/10180, each fully incorporated herein by reference. Activators may also include those comprising or capable of forming non-coordinating anions along with catalytically active metallocene cations. Compounds or complexes of fluoro aryl-substituted boron and aluminum are particularly suitable, see, e.g., U.S. Pat. Nos. 5,198,401; 5,278,119; and 5,643,847.

Support Materials: The catalyst compositions used in the process of this invention may optionally be supported using a porous particulate material, such as for example, clay, talc, inorganic oxides, inorganic chlorides and resinous materials such as polyolefin or polymeric compounds.

Desirably, the support materials are porous inorganic oxide materials, which include those from the Periodic Table of Elements of Groups 2, 3, 4, 5, 13 or 14 metal oxides. Silica, alumina, silica-alumina, and mixtures thereof are particularly desirable. Other inorganic oxides that may be employed either alone or in combination with the silica, alumina or silica-alumina are magnesia, titania, zirconia, and the like.

A particularly desirable support material is particulate silicon dioxide. Particulate silicon dioxide materials are well known and are commercially available from a number of commercial suppliers. Desirably the silicon dioxide used herein is porous and has a surface area in the range of from about 10 to about 700 m$^2$/g, a total pore volume in the range of from about 0.1 to about 4.0 cc/g and an average particle diameter in the range of from about 10 to about 500 μm. More desirably, the surface area is in the range of from about 50 to about 500 m$^2$/g, the pore volume is in the range of from about 0.5 to about 3.5 cc/g and the average particle diameter is in the range of from about 15 to about 150 μm. Most desirably the surface area is in the range of from about 100 to about 400 m$^2$/g, the pore volume is in the range of from about 0.8 to about 3.0 cc/g and the average particle diameter is in the range of from about 20 to about 100 μm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof.

The supported catalyst composition may be used directly in polymerization or the catalyst composition may be prepolymerized using methods well known in the art. For details regarding prepolymerization, see U.S. Pat. Nos. 4,923,833; 4,921,825; and 5,643,847; and EP 279 863 and EP 354 893 (each fully incorporated herein by reference).

Polymerization

The copolymer, which is the copolymerization reaction product of α,ω-diene(s) and olefin(s), may be prepared by slurry polymerization of the olefins and diene under conditions in which the catalyst site remains relatively insoluble and/or immobile so that the polymer chains are rapidly immobilized following their formation. Such immobilization is affected, for example, by (1) using a solid, insoluble catalyst, (2) conducting the copolymerization in a medium in which the resulting copolymer is generally insoluble, and (3) maintaining the polymerization reactants and products below the crystalline melting point of the copolymer.

Generally, the metallocene supported catalyst compositions described above, and in greater detail in the Examples below, are desirable for copolymerizing α,ω-dienes and olefins. The polymerization processes suitable for copolymerizing α,ω-dienes and olefins, and particularly α-olefins, are well known by those skilled in the art and include solution polymerization, slurry polymerization, and low pressure gas phase polymerization. Metallocene supported catalysts compositions are particularly useful in the known operating modes employing fixed-bed, moving-bed, fluid-bed, or slurry processes conducted in single, series or parallel reactors.

Generally, any of the above polymerization process may be used. When propylene is the selected olefin, a common propylene polymerization process is one that is conducted using a slurry process in which the polymerization medium can be either a liquid monomer, like propylene, or a hydrocarbon solvent or diluent, advantageously aliphatic paraffin such as propane, isobutane, hexane, heptane, cyclohexane, etc. or an aromatic diluent such as toluene. In this instance, the polymerization temperatures may be those considered low, e.g., less than 50° C., desirably 0° C.–30° C., or may be in a higher range, such as up to about 150° C., desirably from 50° C. up to about 80° C., or at any ranges between the end points indicated. Pressures can vary from about 100 to about 700 psia (0.69–4.8 MPa). Additional description is given in U.S. Pat. Nos. 5,274,056 and 4,182,810 and WO 94/21962 which are each fully incorporated by reference.

More particularly, the polymerization method of forming a propylene/α,ω-diene copolymer includes contacting a catalyst, and desirably a metallocene catalyst, under suitable polymerization conditions with polymerizable reactants, such as propylene monomers, and α,ω-diene monomers and recovering the propylene/α,ω-diene copolymer. Desirably the metallocene catalyst may be a zirconium metallocene catalyst. Additionally, the contacting step may include hydrogen and ethylene monomers. The hydrogen, in ppm, may be present in the range of 100 to 50,000 and desirably from 500 to 20,000 and most desirably from 1,000 to 10,000 measured as gas phase concentration in equilibrium with liquid propylene at polymerization temperatures. The α,ω-diene monomers, in wt % based upon the total weight of the monomers introduced into the polymerization reactor, may be present in the range of 0.001 to 2 and desirably from 0.003 to 2 and more desirably from 0.003 to 1.5. The ethylene monomer, in wt % based upon the total weight of the monomers introduced into the polymerization reactor, may be present in the range of 0 to 8 and desirably from 1 to 7 and more desirably from 2 to 6. The polymerizable reactants, in wt % based upon the total weight of the monomer(s) and other chemicals introduced into the polymerization reactor, may be present in the range of 90 to 99.999 and desirably from 93 to 99.997 and more desirably from 95 to 99.995.

Pre-polymerization may also be used for further control of polymer particle morphology in typical slurry or gas phase reaction processes in accordance with conventional teachings. For example, this can be accomplished by pre-polymerizing a $C_2$-$C_6$ alpha-olefin for a limited time. For example, ethylene may be contacted with the supported metallocene catalyst composition at a temperature of −15 to 30° C. and ethylene pressure of up to about 250 psig (1724 kPa) for 75 min. to obtain a polyethylene coating on the support. The pre-polymerized catalyst is then available for use in the polymerization processes referred to above. In a similar manner, the activated catalyst on a support coated with a previously polymerized polymer can be utilized in these polymerization processes.

Additionally it is desirable to reduce or eliminate polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds of 5,153,157 and WO-A-91/09882 and WO-A-94/03506, noted above, and that of WO-A-93/14132.

Additives and Modifiers

These additives may be those commonly employed with plastics. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, hydrocarbon resins, rosins or rosin esters, waxes, additional plasticizers and other additives in conventional amounts. Effective levels are known in the art and depend on the details of the base polymers, the fabrication mode and the end application. In addition, hydrogenated and/or petroleum hydrocarbon resins and other plasticizers may be used as modifiers.

The polypropylene copolymers described herein are suitable for applications such as molded articles, including injection and blow molded bottles and molded items used in automotive articles, such as automotive interior and exterior trims. Examples of other methods and applications for making polypropylene polymers and for which polypropylene polymers may be useful are described in the Encyclopedia of Chemical Technology, by Kirk-Othmer, Fourth Edition, vol. 17, at pages 748–819, which are incorporated by reference herein. In those instances where the application is for molded articles, the,molded articles may include a variety of molded parts, particularly molded parts related to and used in the automotive industry, such as for example bumpers, side panels, floor mats, dashboards and instrument panels. Foamed articles are another application and examples where foamed plastics, such as foamed polypropylene, are useful may be found in Encyclopedia of Chemical Technology, by Kirk-Othmer, Fourth Edition, vol. 11, at pages 730–783, which are incorporated by reference herein. Foamed articles are particularly useful for construction and automotive applications. Examples of construction applications include heat and sound insulation, industrial and home appliances, and packaging. Examples of automotive applications include interior and exterior automotive parts, such as bumper guards, dashboards and interior liners.

The embodiments shown below are all within the scope of this invention. The first row exemplifies an embodiment that has 90 wt % monomer, no comonomer and 0.001 wt % α,ω-diene.

| Monomer wt % | Comonomer wt % | α,ω-diene wt % | Monomer wt % | Comonomer wt % | α,ω-diene wt % |
|---|---|---|---|---|---|
| 90 | 0 | 0.001 | 99.999 | 0 | 0.003 |
| 90 | 0 | 0.003 | 99.999 | 0 | 0.005 |
| 90 | 0 | 0.005 | 99.999 | 0 | 0.2 |
| 90 | 0 | 0.2 | 99.999 | 0 | 1 |
| 90 | 0 | 1 | 99.999 | 0 | 1.5 |
| 90 | 0 | 1.5 | 99.999 | 0.1 | 0.001 |
| 90 | 0.1 | 0.001 | 99.999 | 0.1 | 0.003 |
| 90 | 0.1 | 0.003 | 99.999 | 0.1 | 0.2 |
| 90 | 0.1 | 0.005 | 99.999 | 0.1 | 1 |
| 90 | 0.1 | 0.2 | 99.999 | 0.1 | 1.5 |
| 90 | 0.1 | 1 | 99.999 | 0.5 | 0.001 |
| 90 | 0.1 | 1.5 | 99.999 | 0.5 | 0.003 |
| 90 | 0.5 | 0.001 | 99.999 | 0.5 | 0.005 |
| 90 | 0.5 | 0.003 | 99.999 | 0.5 | 0.2 |
| 90 | 0.5 | 0.005 | 99.999 | 0.5 | 1 |
| 90 | 0.5 | 0.2 | 99.999 | 0.5 | 1.5 |
| 90 | 0.5 | 1 | 99.999 | 3 | 0.001 |
| 90 | 0.5 | 1.5 | 99.999 | 3 | 0.003 |
| 90 | 3 | 0.001 | 99.999 | 3 | 0.005 |
| 90 | 3 | 0.003 | 99.999 | 3 | 0.2 |
| 90 | 3 | 0.005 | 99.999 | 3 | 1 |
| 90 | 3 | 0.2 | 99.999 | 3 | 1.5 |
| 90 | 3 | 1 | 99.999 | 6 | 0.001 |
| 90 | 3 | 1.5 | 99.999 | 6 | 0.003 |
| 90 | 6 | 0.001 | 99.999 | 6 | 0.005 |
| 90 | 6 | 0.003 | 99.999 | 6 | 0.2 |
| 90 | 6 | 0.005 | 99.999 | 6 | 1 |
| 90 | 6 | 0.2 | 99.999 | 6 | 1.5 |
| 90 | 6 | 1 | 99.999 | 8 | 0.001 |
| 90 | 6 | 1.5 | 99.999 | 8 | 0.003 |
| 90 | 8 | 0.001 | 99.999 | 8 | 0.005 |
| 90 | 8 | 0.003 | 99.999 | 8 | 0.2 |
| 90 | 8 | 0.005 | 99.999 | 8 | 1 |
| 90 | 8 | 0.2 | 99.999 | 8 | 1.5 |
| 90 | 8 | 1 | 99.999 | 0 | 0.003 |
| 90 | 8 | 1.5 | 99.999 | 0 | 0.005 |

EXAMPLES

General

Polymerization was conducted in either a laboratory two-liter autoclave reactor or a series of two 150 gallon stirred tanks, auto refrigerated boiling liquid reactors. Monomer feed and catalyst preparation procedures for each were similar. Polymerization grade propylene monomer was purified by passing first through basic alumina activated at 600° C., followed by molecular sieves activated at 600° C. 1,9-decadiene (96%) was purchased from Aldrich-Sigma Bulk Chemicals and used as received. Purification of diene can be conducted, if needed.

Basic polymer characterization on the products included the following tests. Melt flow rate (MFR) of the polymers was measured using ASTM D-1238 at 230° C. and 2.16 kg load. Molecular weight of the polymers was analyzed by GPC using Waters 150C. high temperature system with a DRI detector and Showdex AT-806MS column. The procedure used was an ExxonMobil method, similar to techniques described in the scientific literature. Melting and crystallization temperatures of the polymers were measured on a TA Instrument DSC-912 using a heating and cooling rate of 10° C./min with a starting temperature of 0° C. and a stopping temperature of 250° C. The melting temperatures reported were obtained from the second melt. Alternately, a Perkin-Elmer DSC 7 unit was also used, utilizing similar test conditions. Recoverable compliance, which is a technique to characterize the high molecular weight end of the molecular weight spectrum, was measured using a Rheometrics Dynamic Stress Rheometer (DSR).

Catalyst Preparation

All catalyst preparations were performed in an inert atmosphere with <1.5 ppm H2O content. The silica support, available from Grace Davison, a subsidiary of W.R. Grace Co., CT, as Sylopol® 952 having $N_2$ pore volume 1.63 cc/g and a surface area of 312 $m^2/g$ was calcined at 600° C. under a dry nitrogen flow for 8–24 hours to achieve a hydroxyl content of 0.8 to 1.2 mmol/g silica.

Catalyst A: In a nitrogen purged dry glove box, the metallocene, dimethylsilylbis(2-methyl-4-phenyl indenyl) zirconium dichloride (0.090 g, 0.143 mmole) was weighed into a 100 mL beaker. Methylalumoxane (MAO, 4.65 g, 30% in toluene) was added to the beaker. The mixture was stirred for 1 hour to dissolve and activate the metallocene. After 1 hour, the activated metallocene solution was diluted with 10 g of toluene and added slowly to the calcined silica (5.00 g) with manual mix until the slurry was uniform in color. The slurry was transferred to a 250 mL flask connected to an inline glass frit. Solvent was removed by vacuum and catalyst was dried under vacuum. Metallocene loading was found to be 0.022 mmol of transition metal per gram of the catalyst.

Catalyst B: In a nitrogen purged dry glove box, the calcined silica (394.32 g) was weighed and placed in a 3-neck, 4 L reactor that was fitted with an overhead stirrer. The dry toluene, 2 L, was added and the mixture was stirred vigorously. The N,N-diethylaniline (27.6 ml, 0.174 mole) was added using a syringe. The tris(perfluorophenyl)boron (85.96 g, 0.168 mole) was added as a solid. The above mixture was stirred for 1 hour. The metallocene, dimethylsilylbis(2-methyl-4-phenyl indenyl)zirconium dimethyl (5.99 g, 0.0102 mole) was added and the reaction mixture was stirred for additional 2 hours. The solvent was decanted off and the solid was dried under vacuum overnight. Metallocene loading was found to be 0.02 mmol of transition metal per gram of catalyst.

Catalyst C: In a nitrogen purged dry glove box, the calcined silica (500 g) was charged to vessel that was equipped with an overhead stirrer. A solution of tris (perfluorophenyl)boron (30 g, 0.059 mole) in hexane (2 L), was added to silica followed by addition of N,N-diethylaniline (9.6 ml, 0.061 mole). The mixture was stirred at 49° C. for 1 hour. In a separate container, dimethylsilylbis (2-methyl-4-phenyl indenyl)zirconium dimethyl (4.5 g, 0.0077 mole), hexane (820 mL), triethylaluminium (187 mL, 25 wt % in heptane), and 1,9-decadiene (10 mL) were mixed to form a slurry. The 1,9-decadiene is used in this instance as a Lewis base to stabilize the catalyst, for instance by improving its shelf life. Other Lewis bases, such as other dienes including those described above and styrene, are known to be suitable for stabilizing the catalyst and may also be used. The slurry was then transferred to the silica-containing vessel, and the mixture was stirred at 49° C. for additional 1 hour. The solvent was removed by purging with nitrogen for 14 hours, and a free flowing solid catalyst was obtained. Metallocene loading was 0.015 mmol of transition metal per gram of catalyst.

Catalyst D: This is a conventional commercial Ziegler-Nana catalyst from Toho Corporation in Japan. It was used to prepare Comparative Example 13.

Catalyst E: This catalyst was used to prepare Comparative Example 14 and is described in U.S. Pat. No. 5,670,595.

Catalyst F: This catalyst was used to prepare Comparative Example 15. The preparation is similar to that for Catalyst B above, but TEAL treatment and a catalyst promoter were used in addition. 0.5 kg batches of Catalyst F were prepared per the following scheme: In a nitrogen purged dry glove box:

Tris(perfluorophenyl)boron in toluene added to the 952 silica and well mixed

N,N-diethylaniline added to the mix using a syringe; stirring continued

TEAL (Triethylaluminum) added to the mix with continued stirring

Metallocene dimethylsilylbis(2-methyl-4-phenyl indenyl) zirconium dichloride plus promoter, phenyldimethylvinylsilane, added and reaction mixture held with continuous stirring for an additional hour Solvent removed and catalyst dried via nitrogen purging at 50° C.

The reaction sequence shown above is critical to obtaining good activity from the resulting catalyst. Characterization of Catalyst F gave the following loadings: 0.026 mmole Zr/g $SiO_2$; 0.11 mmole B/g $SiO_2$; 0.11 mmole promoter/g $SiO_2$ and 0.57 mmole TEAL/g $SiO_2$.

Catalyst G: This catalyst was used to prepare Comparative Example 16. The catalyst was prepared using dimethylsilylbis(2-methyl-4-phenyl indenyl) zirconium dichloride metallocene, methylalumoxane (MAO) in toluene as activator, styrene as promoter, AS 990 (Witco Chemical) to lower reactor fouling potential and Davison XPO 2407 silica (Grace Davison, Baltimore, Md.) as support material. The catalyst preparation procedure is known in the art. Specific catalyst characterization details for the prepared catalyst were: 0.028 mmole Zr/g SiO2; 4.8 mmole AL/g SiO2; 7.1 styrene to Zirconium loading; 1% AS 990. Several batches of the catalyst system were combined to provide the amount needed for a polymerization run. The catalyst was oil slurried with Drakeol™ white mineral oil (Witco Chemical) for ease of addition to the reactor.

Polymerization Examples

Example 1

Polymerization was conducted in a 2-liter autoclave reactor. The reactor was charged with triethylaminium (TEAL, 0.5 mL of 1M solution in hexane), 1,9-decadiene (0.25 mL or 200 ppm), and hydrogen (30 mmole). Then, liquid propylene (1 L) was added to the reactor, and the Catalyst A (200 mg in mineral oil) was injected with another 200 cc of propylene. The reactor was heated to 70° C. with stirring. After 1 hour, the reactor was cooled to 25° C. and vented. The polymer was collected, and dried in air for 8 hours (yield: 260 g). The product had a MFR of 26 dg/min. The GPC measurement of this product gave a number average molecular weight (Mn) of 19,000 and a weight average molecular weight (Mw) of 167,000. The polymer had a melting point of 153.3° C., and crystallization temperature (without any externally added nucleating agent) of 122.6° C. The recoverable compliance was $18.6 \times 10^{-5}$ cm$^2$/dyne.

Example 2

A 2-liter autoclave reactor was charged with triethylaminium (TEAL, 0.6 mL of 1M solution in hexane), 1,9-decadiene (0.50 mL or 400 ppm), and hydrogen (24 mmole). Then, liquid propylene (1 L) was added to the reactor, and the reactor was heated to 70° C. with stirring. The Catalyst B (101 mg) was injected with another 250 cc of propylene. The reactor temperature was kept at 70° C. After 1 hour, the reactor was cooled to 25° C. and vented. The polymer was collected, and dried in air for 8 hours (yield: 246 g). The product had a MFR of 3.2 dg/min. The GPC measurement of this product gave a number average molecular weight (Mn) of 48,000 and a weight average molecular weight (Mw) of 221,000. The polymer had a melting point of 155.1° C., and crystallization temperature (without any externally added nucleating agent) of 115.9° C. The recoverable compliance was $42.1 \times 10^{-5}$ cm$^2$/dyne.

Example 3–10

Propylene/diene copolymers were produced in a pilot scale, continuous, bulk liquid phase system employing two 150 gallon stirred tank, auto refrigerated boiling liquid reactors in series. The reactors were equipped with jackets for removing the heat of polymerization. Catalyst C was used. The conditions in the two reactors were as follows:

|  | Reactor 1 | Reactor 2 |
| --- | --- | --- |
| Reaction Temperature (° F.) | 165 | 155 |
| Propylene flow rate (lb/hr) | 175 | 65 |
| Gas phase H$_2$ conc. (ppm) | 3500–2500 | 3500–2500 |
| Solid Concentration (wt %) | 25–30 | 25–30 |

All polymers were made with varying levels of 1,9-decadiene (4.5–9.5% in hexane) charged to reactor 1. The hydrogen (for molecular weight control) and diene levels used to make the different polymer Examples are shown in Table 1. Some basic characterization data are also listed in Table 1. The melting points of the propylene/diene copolymers ranged from 153–155° C., while the crystallization temperatures (without any externally added nucleating agent) were nearly constant at ~124–125° C. Recoverable compliance values ranged from $\sim 7 \times 10^{-5}$ to $17 \times 10^{-5}$ cm$^2$/dyne.

Comparative Example 11

This homopolymer was produced using the same reactor and catalyst (Catalyst A) as Example 1. The polymerization was conducted at 70° C. in similar fashion to that described under Example 1, except no 1,9 decadiene was added to the reactor. Hydrogen feed was 14 mmole. Polymer yield was about 415 g. The product had a MFR of 24 dg/min. GPC measurement gave a number average molecular weight (Mn) of 33,600; a weight average molecular weight (Mw) of 169,900. The polymer had a melting point of 151.5° C. The crystallization temperature (without any externally added nucleating agent) was 110.5° C. The recoverable compliance was $2.8 \times 10^{-5}$ cm$^2$/dyne.

Comparative Example 12

This homopolymer was produced in the same reactor system as described in Examples 3–10, except no 1,9-decadiene was added during the propylene polymerization. Catalyst C was used. The conditions in the two reactors were as follows:

|  | Reactor 1 | Reactor 2 |
| --- | --- | --- |
| Reaction Temperature (° F.) | 165 | 155 |
| Propylene flow rate (lb/hr) | 175 | 65 |
| Gas phase H$_2$ conc. (ppm) | 3500 | 3500 |
| Solid Concentration (wt %) | 25–30 | 25–30 |

The product had a MFR of 20.4 dg/min. The GPC measurement of this product gave a number average molecular weight (Mn) of 55,000 and a weight average molecular weight (Mw) of 155,000. The polymer had a melting point of 152.2° C., and crystallization temperature (without any externally added nucleating agent) of 112.9° C. The recoverable compliance was $1.32 \times 10^{-5}$ cm$^2$/dyne.

Comparative Example 13

This example demonstrates that the propylene/diene copolymer made with conventional Ziegler-Natta catalyst does not show the property enhancements observed in the invention copolymers. The copolymer was made in a 2-liter autoclave reactor. The reactor was charged with triethylaminium (TEAL, 2.0 mL, 1M solution in hexane), dicyclopentyl dimethoxysilane (DCPMS, 2.0 mL, 0.1 M solution in hexane), 1,9-decadiene (2.0 mL), and hydrogen (150 mmole). Then, liquid propylene (1 L) was added to the reactor, and the catalyst (Catalyst D, 200 mg, 5 wt % in mineral oil) was injected with another 250 cc of propylene. The reactor was heated to the 70° C. with stirring. After 1 hour, the reactor was cooled to 25° C. and vented. The copolymer was collected, and dried in air for 8 hours (yield: 460 g). The product had a MFR of 4.2 dg/min. The GPC measurement of this product gave a number average molecular weight (Mn) of 101,000 and a weight average molecular weight (Mw) of 567,000. The copolymer had a melting point of 168.7° C., and crystallization temperature (without any externally added nucleating agent) of 114.2° C. The recoverable compliance was $4.22 \times 10^{-5}$ cm$^2$/dyne.

Comparative Example 14

This example demonstrates that the propylene/diene copolymer made with catalyst/conditions other than the ones used in this invention does not show the property enhancement as those observed in the disclosed compositions. (The propylene/diene copolymer was made under similar conditions as those described in U.S. Pat. No. 5,670,595). A 2-liter autoclave reactor was charged with triisobutylaluminium (2.0 mL of 1M solution in toluene), 1,13-tetradecadiene (1.0 mL), liquid propylene (200 mL), and toluene (600 mL). The reactor was heated to 60° C. with stirring and equilibrated for 3 minutes. Catalyst E (3.5 mg of dimethylsilyl bis (indenyl) hafnium dimethyl and 4 mg of N,N-dimethylanalynium tetrakis(perfluorophenyl) borate dissolved together in 5 mL of toluene) was injected into the reactor. The polymerization was allowed to run for 30 min, then the reactor was cooled to 25° C. and vented. The copolymer was precipitated into methanol, filtered, and dried in air for 8 hours (yield: 25 g). The product had a MFR of 40 dg/min. The GPC measurement of this product gave a number average molecular weight (Mn) of 73,000 and a weight average molecular weight (Mw) of 150,000. The polymer had a melting point of 133.6° C., and crystallization temperature (without any externally added nucleating agent) of 93.5° C. The recoverable compliance was $5.05 \times 10^{-5}$ cm$^2$/dyne.

Comparative Example 15

This example demonstrates the polymerization of a homopolymer without 1,9 decadiene. It was used as a blend component with the invention polymers in blow molding and thermoforming experiments.

The polymerization was conducted in a pilot scale, two reactor, continuous, stirred tank, bulk liquid phase process. The reactors were equipped with jackets for removing the heat of polymerization. The reactor temperatures were 70° C. in the first reactor and 64° C. in the second reactor. Catalyst F was fed at a rate of about 1.3 g/hr. TEAL (2.0 wt % in hexane solution) was used as a scavenger and added at a rate of 13 wppm. The catalyst system prepared above was fed as a 20% slurry in mineral oil and was flushed into the first reactor with propylene. Total propylene feed to the first reactor was about 80 kg/hr. Propylene monomer feed to the second reactor was 30 kg/hr. Hydrogen was added for molecular weight control at a rate of 950 mppm to the first reactor and 1450 mppm to the second reactor. Reactor residence times were 2.6 hr in the first reactor and 1.8 hr in the second reactor. Overall polymer production was about 30 kg/hr. About 69% of the final polymer product was obtained from the first reactor and about 31% from the second reactor. Polymer was discharged from the reactors as a granular product of about 1100 Am average particle size. The MFR (at 230° C.) of the final granules was about 2.7 dg/min. The GPC measurement of this product gave a number average molecular weight (Mn) of about 121,300 and a weight average molecular weight (Mw) of about 305,500. The polymer had a melting point of 152.4° C., and crystallization temperature (without any externally added nucleating agent) of 110.7° C. The recoverable compliance was $3.0 \times 10^{-5}$ cm$^2$/dyne.

Comparative Example 16

This example demonstrates the polymerization of a homopolymer without 1,9 decadiene. It was used as a blend component with the invention polymers in film forming experiments.

The polymerization was conducted in a pilot scale, two reactor, continuous, stirred tank, bulk liquid phase process. The reactors were equipped with jackets for removing the heat of polymerization. The reactor temperatures were 70° C. in the first reactor and 64.5° C. in the second reactor. Catalyst G was fed at a rate of 4.03 g/hr. TEAL (2 wt % in hexane) was used as scavenger and added at a rate of 13.6 wppm. The catalyst was fed as a 20% slurry in mineral oil and was flushed into the first reactor with propylene. Total propylene monomer fed to the first reactor was 79.5 kg/hr, propylene feed to the second reactor was 27.1 kg/hr. Hydrogen was added for molecular weight control at a rate of 1809 mppm to the first reactor and 2455 mppm to the second reactor. Residence times were 2.5 hr in the first reactor and 1.8 hr in the second reactor. Polymer production rates were 21.2 kg/hr from the first reactor and 9 kg/hr from the second reactor. About 70% of the final polymer product was derived from the first reactor and 30% from the second reactor. Polymer was discharged from the reactors as a granular product of about 0.49 g/ml bulk density. The MFR (at 230° C.) of the final granules was about 12 dg/min. The GPC measurement of this product gave a number average molecular weight (Mn) of about 75,600 and a weight average molecular weight (Mw) of about 211,000. The polymer had a melting point of 151.4° C., and crystallization temperature (without any externally added nucleating agent) of 109.9° C. The recoverable compliance was $0.89 \times 10^{-5}$ cm$^2$/dyne.

A review of the characterization data shows the invention polymers to display unique thermal properties as demonstrated by their DSC melting and crystallization behavior. FIG. 1 shows the melting curves of the invention polymers (Examples 5, 6 and 8) and Comparative Example 12, which was polymerized under similar conditions and on the same unit as Examples 5, 6, and 8, but with no diene added during the polymerization. The inventive copolymers have at least two crystalline populations wherein the melting point range of one of the crystalline populations is distinguishable from the melting point range of the other crystalline population by at least 1° C., desirably by at least 2° C., more desirably by at least 3° C., and still more desirably by a temperature range from 2° C. to 4° C. Even more desirably, the melting point range of one of the crystalline populations is distinguished from the melting point range of the other crystalline population by a temperature range from 1° C. to 16° C. To reiterate more specifically, in addition to a melting point of one of the populations at around 155° C. (in a temperature range of between 152° C. and 158° C.), another shoulder, indicating another crystalline population, having a melting point at around 145° C. (in a temperature range of between 142° C. and 148° C.) is observed. The presence of multiple crystalline populations having different melting points significantly broadens the overall melting range of the copolymer. This property is highly desired in some commercial applications. For example, in thermoforming the broadened melting range translates to a broader forming window; in film heat sealing/converting operations the broadened melting range offers wider processing latitude and a higher probability that the converted film packages will be leak-free.

TABLE 1

Characterization of the Polymers in Examples and Comparative Examples.

| Example | Catalyst* | Diene (ppm) | H$_2$ | MFR (dg/min) | Mn | Mw | Tm (° C.) | Tc (° C.) | Compliance ($10^{-3}$ cm$^2$/dyn) |
|---|---|---|---|---|---|---|---|---|---|
| 1 | A | 200 | 30 mmol | 27 | 19,000 | 167,000 | 153.3 | 122.6 | 18.6 |
| 2 | B | 400 | 24 mmol | 3.2 | 48,000 | 221,000 | 155.1 | 115.9 | 42.1 |

TABLE 1-continued

Characterization of the Polymers in Examples and Comparative Examples.

| Example | Catalyst* | Diene (ppm) | H$_2$ | | MFR (dg/min) | Mn | Mw | Tm (° C.) | Tc (° C.) | Compliance (10$^{-3}$ cm$^2$/dyn) |
|---|---|---|---|---|---|---|---|---|---|---|
| 3 | C | 200 | 3000 | ppm | 10.1 | 79,000 | 271,000 | 153.9 | 122.2 | 15.2 |
| 4 | C | 250 | 3000 | ppm | 5.5 | 97,000 | 355,000 | 154.6 | 124.4 | 16.8 |
| 5 | C | 300 | 3000 | ppm | 4.2 | 102,000 | 391,000 | 155.0 | 125.0 | 13.3 |
| 6 | C | 350 | 3500 | ppm | 2.9 | 128,000 | 453,000 | 154.4 | 125.1 | 10.3 |
| 7 | C | 375 | 3500 | ppm | 2 | 129,000 | 467,000 | 154.3 | 125.6 | 14.8 |
| 8 | C | 375 | 4000 | ppm | 7.3 | ** | ** | 154.0 | 124.8 | 17.2 |
| 9 | C | 375 | 3500 | ppm | 5.3 | 102,000 | 394,000 | 154.3 | 124.9 | 10.1 |
| 10 | C | 375 | 3500 | ppm | 3.9 | 115,000 | 432,000 | 154.1 | 125.6 | 7.0 |
| Comp. 11 | A | 0 | 14 | mmol | 24 | 33,600 | 169,900 | 151.5 | 110.5 | 2.8 |
| Comp. 12 | C | 0 | 3000 | ppm | 23 | 64,000 | 184,000 | 152.2 | 112.9 | 1.3 |
| Comp. 13 | D | 1600 | 150 | mmol | 4.2 | 101,000 | 567,000 | 168.7 | 114.2 | 4.2 |
| Comp. 14 | E | 1200 | — | | 40 | 73,300 | 93,600 | 133.6 | 93.5 | 5.1 |
| Comp. 15 | F | 0 | 1000 | ppm | 2.7 | 121,300 | 305,500 | 152.4 | 110.7 | 3.0 |
| Comp. 16 | G | 0 | 2100 | ppm | 12 | 75,600 | 211,000 | 151.4 | 109.9 | 0.89 |

*Catalyst: A, B, C, F and G—see Catalyst Preparation Section.
D—Conventional Z—N catalyst (from TOHO)
E—Dimethylsilyl bis(indenyl) halnium dimethyl activated with N,N-dimethylanalynium tetrakis (perfluorophenyl)borate.
**Not measured
+ No externally added nucleating agent.

The crystallization temperatures of the invention diene copolymers are also unique. A much higher and nearly constant crystallization temperature, Tc, of ~124 to 125° C. was measured for invention polymer Examples 3 to 10 versus a Tc of 112.9° C. for Comparative Example 12 (same polymerization set-up, but no diene). The Tc values for the invention polymers were also higher than those of the propylene/diene copolymers illustrated in Comparative Examples 13 and 14, as well as in U.S. Pat. No. 5,670,595 and patent application WO 99/11680. Higher Tc allows part ejection, in molding operations, at higher temperatures, which could significantly reduce the cycle time in polymer fabrication processes such as injection molding and blow molding. It is to be noted again that these crystallization temperatures are without the use of externally added nucleating agents.

The characterization data in Table 1 also show the invention polymers to display higher values of recoverable compliance than the Comparative Examples. The diene-containing polymers of the invention have long branches that influence the recoverable compliance. Values in the table range from 7 to 42 (×10$^{-5}$ cm$^2$/dyn); by comparison, the Comparative Examples are all ≦5×10$^{-5}$ cm$^2$/dyne. These values reflect the higher levels of melt elasticity and melt strength for the invention Examples. It should be noted that the recoverable compliance values in Table 1 reflect measurements on products following uniform initial pelletization of reactor granules. The values tend to decrease with increased mechanical working (e.g. during further compounding/melt homogenization).

Additional data on the favorable rheological features of these polymers is presented later when extensional viscosity results are reviewed.

Experimental
i. Injection Molded Part Properties

The propylene/1,9-decadiene copolymer from Example 1 and the corresponding homopolymer Comparative Example 11, were separately injection molded using a Butler Laboratory Injection molding machine (Model No. 10/90V). Both polymers were stabilized with an additive package comprising 750 ppm Irganox-1076 (Ciba Geigy Corp) and 250 ppm calcium stearate (Witco Chemical). Conditions of about 190° C. temperature and about 30 psi pressure were used to fabricate ASTM-type specimens (approximately 127 mm×12.7 mm×3.175 mm). The tensile yield stress (ASTM D-638), 1% sec flexural modulus (ASTM D-790A) and heat distortion temperature (HDT; ASTM D-648) were measured on injection molded parts from both the above polymers. The results are shown in Table 2.

TABLE 2

Mechanical Properties of Inventive and Comparison Examples

| | Example 1 | Comparative Example 11 |
|---|---|---|
| Tensile yield stress (psi) | 5170 | 4920 |
| 1% Sec Flex Modulus (kpsi) | 311 | 202 |
| HDT (° C.) | 129 | 118.5 |

The data in Table 2 indicate surprisingly good performance for the injection molded diene copolymer over the homopolymer control, with high levels of stiffness and heat distortion resistance. The significantly higher modulus will be advantageous in applications requiring high levels of structural rigidity. Use of these inventive polymers could, for example, allow a molder to forgo the incorporation of high filler loadings (e.g. talc, calcium carbonate), with obvious cost and performance benefits. These enhanced properties are believed to result from the favorable morphology of the injection molded parts.

The inventive copolymer Examples 3 through 10 and the corresponding control, Comparative Example 12, were also injection molded. The polymers were stabilized with a package of 750 ppm Irganox 1076 (Ciba Geigy Corp) and 250 ppm calcium stearate (Witco Chemical) and injection molded on a 75 Ton Van Dorn injection press (model No. 75-RS-3F), to produce a selection of ASTM test specimens. Molding conditions included a straight extrusion temperature profile of 240° C., maximum screw speed to provide high shear, injection pressure of 600 psi and a mold temperature of 60° C. Sample testing included the tensile yield stress (ASTM D-638), 1% secant flexural modulus (ASTM D-790A) and heat distortion temperature (HDT; ASTM D-648). The data are presented in Table 3.

TABLE 3

Mechanical Properties of Inventive and Comparison Examples

| Sample ID | 1% Sec Flex Mod (kpsi) | Tensile Yield Strength (psi) | HDT(° C.) |
| --- | --- | --- | --- |
| Comp Example 12 | 226 | 5290 | 108.5 |
| Example 3 | 259 | 5410 | 117.1 |
| Example 4 | 263 | 5570 | 117.2 |
| Example 5 | 269 | 5580 | 117.2 |
| Example 6 | 267 | 5655 | 113.0 |
| Example 7 | 273 | 5650 | 116.1 |
| Example 8 | 279 | 5640 | 115.7 |
| Example 9 | 284 | 5680 | 116.0 |
| Example 10 | 280 | 5770 | 114.6 |

As is seen from the data in Table 3, the flex modulus, HDT and tensile strength for the diene-based copolymers (Example 3 through 10) are again higher than the values for the non-diene control (Comparative Example 12), which is advantageous. The enhanced levels of flexural modulus and HDT offer improved structural rigidity both at ambient temperatures and elevated temperatures. One implication of this in the packaging field is the capability to fill containers (made from the invention resins) with hot ingredients with less deformation than would be possible by using the corresponding Comparison Example(s).

Figure 2:
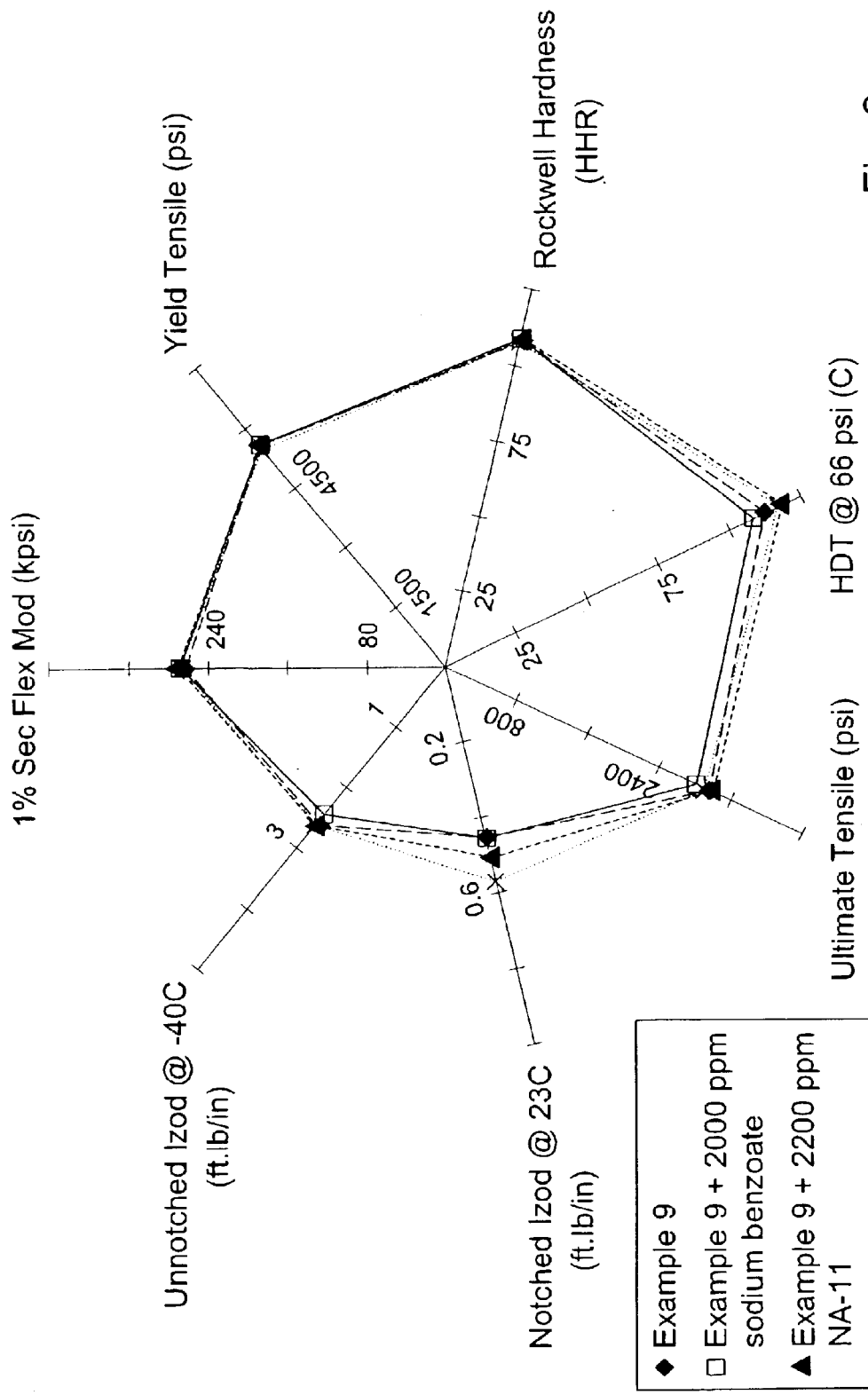
FIG. 2 is a radar plot of the injection molded part properties profile for neat Example 9 and Example 9 with different commercially used nucleating agents for polypropylene

In the polypropylene industry, increases in crystallinity-related properties (like flexural modulus, yield tensile strength and HDT) are commonly attained via the incorporation of externally added nucleating agents. Typical nucleating agents used commercially with propylene polymers are sodium benzoate (e.g. from Mallinckrodt, Inc), sorbitol-based products (e.g. Millad 3988 from Milliken Chemical Co.) and organophosphate metal salts (e.g. NA-11 from Am-fine). Surprisingly, when these external nucleating agents are incorporated in the invention polymers, very little additional property enhancement is achieved. This is a case of a reactor propylene polymer not being responsive to any of the major nucleating agents utilized routinely with polypropylene at the present time. This is shown in FIG. 2. The data show profiles of molded part properties of 4 products: Example 9, and Example 9 after incorporation of each of the 3 nucleating agents referenced above. The nucleating agent concentrations were 2000 ppm for sodium benzoate, 2200 ppm for NA-11 and 2500 ppm for Millad 3988. ASTM parts were injection molded using a 75 Ton Van Dom injection press and measurements of tensile properties (ASTM D-638), 1% sec flex modulus (ASTM D-790A), Izod impact strength (ASTM D-256, Method A), heat distortion temperature (ASTM D-648) and Rockwell hardness (ASTM D-785-93) were conducted. The property profiles are seen to be comparable for the four products, highlighting the self-nucleating capability of the invention polymer (Example 9) and the non-response to the added nucleating agents. This non-response to a variety of nucleating agents, which are known to be active in polypropylene in general, points to a unique composition of matter for the invention polymers. In line with this unique behavior, the invention polymers show substantial morphological differences in the solid state, as will be seen in the polarized light measurements discussed below.

ii. Polarized Light Microscopy on Molded Parts

The morphology (the solid-state molecular arrangement and structure) of a molded article formed from a semi-crystalline polymer material like polypropylene is typically heterogeneous over its cross-section, since the orientation in the melt and the cooling rate differ from one point to the next in the mold cavity. A review of the current literature in this field can be found in the Polypropylene Handbook (Hanser Publishers, 1996 edition, New York), edited by E. P. Moore.

Generally, the cross-sectional morphology is composed of different layers. The degree of differentiation among the layers depends on many factors, including the polymer features and the specific molding parameters used. However, a description of the layer morphology in terms of an outer "skin-layer", a transition "shear zone" and an inner "core layer" is a useful representation. Furthermore, it has been observed that the morphology of the skin layer of molded items, and particularly injection molded items, is different than that of the core. The skin layer is typically thin and featureless, while the core layer is characterized by spherulites, which are very often well-formed. The shear zone is generally characterized by the presence of many layers (sometimes called "threads") that are not distinguishable from one another near the skin, but become identifiable when approaching the core. These layers contain row nucleated spherulites, which are generally small and poorly formed. The features and definition of the shear zone are poor when compared with the core morphology.

Polarized light microscopy on injection molded bars (fabricated using the Butler laboratory injection molding machine and conditions described above; approximate bar dimensions 125 mm×12.5 mm×3 mm) of the invention polymers show significant differences with the corresponding no-diene homopolymer comparator. These differences pertain primarily to the shear zone, which for the invention polymers is substantially thicker and more pronounced. In order to be able to conveniently quantify the differences between the shear layer of the invention polymers and that of the comparator resin, the skin layer and shear layer will be combined and referred to as the "effective skin layer". This entity can be readily estimated from polarized light micrographs, as is described below.

Figure 3:
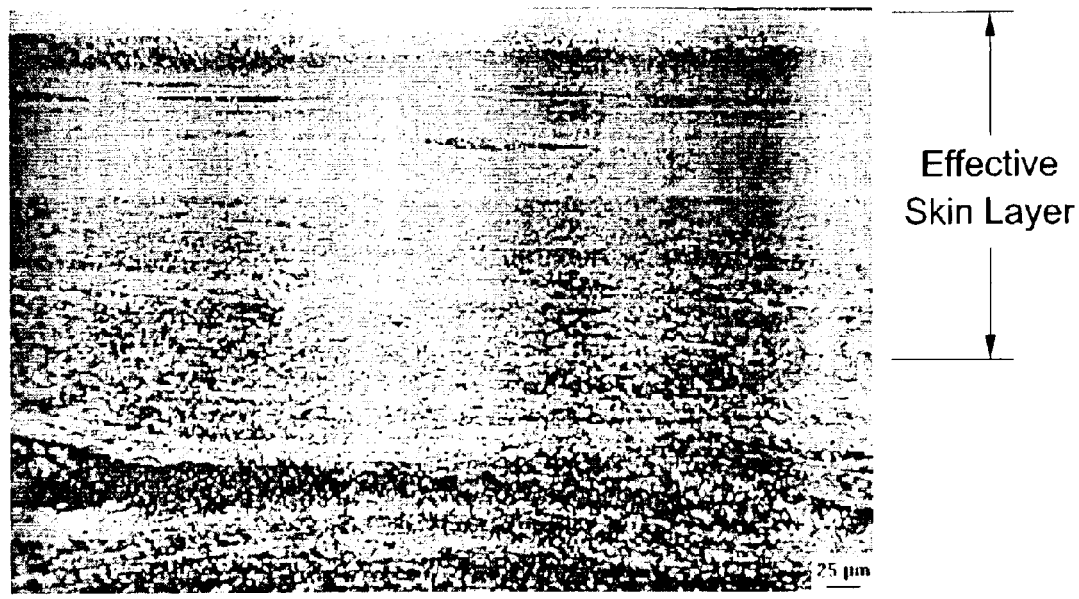
FIG. 3 is a micrograph of a partial cross-section of a molded specimen formed from the copolymer of Example 1.

The cross-sections of molded parts from the invention copolymer Example 1 and Comparative Example 11 were examined under a polarized light microscope. A partial cross-sectional (flow direction—normal direction cross-section) view of each specimen is shown in the micrographs in FIGS. 3A and 3B. Referring to FIG. 3A, the copolymer from Example 1 clearly shows an effective skin layer of 70–80 $\mu$m (or about 2 percent of the total thickness of the specimen at the point of measurement). This effective skin layer thickness is the distance from the outer edge of the molded bar to the position on the micrograph showing the beginning of the development of spherulitic structures, which signifies the start of the core layer. This effective skin layer dimension is significantly thicker than the effective skin layer of the conventional metallocene polypropylene in FIG. 3B. The metallocene polypropylene (Comparative Example 11) shown in FIG. 3B has an effective skin layer less than 5 $\mu$m thick (or about $1 \times 10^{-1}$ percent of the total thickness of the specimen at the point of measurement). Again, this measurement is the distance from the outer edge of the molded article to the beginning of the development of spherilitic structures, signifying the start of the core layer. The invention copolymer has very distinctive bands in the effective skin layer along the flow direction, that are believed to be row nucleated structures. This is not observed for Comparative Example 11. This observation points out the clear difference between the invention polymers and the comparative control.

The properties and thus the use of a molded article depends on the morphology of the article, of which the skin layer and the effective skin layer thickness are key components. Generally, a molded article having a thinner effective skin layer thickness would be less rigid than a similarly molded article having a correspondingly thicker layer. Examples of applications typically requiring molded articles with high rigidity include injection and blow molded bottles for good top load strength and molded items used in automotive articles, such as automotive interior and exterior trims where rigidity arid resistance to marking and scuffing is desired.

The effective skin layer thickness will be dependent on the overall dimensions of the molded article. Still, it is highly desirable that the effective skin layer of a molded article formed from polymers and particularly from the invention copolymers described herein, under the conditions described above, have a layer thickness in the range of from 10 µm to 120 µm, desirably from 20 µm to 110 µm and more desirably from 30 µm to 100 µm. Additionally, it is desirable that the effective skin layer of a molded article, such as a bottle or automotive part, (e.g. interior or exterior trim article), formed by polymers, and particularly the invention copolymers described herein, have a thickness proportional to the thickness of the molded article of from 0.4 to 15 percent of the total thickness of the molded article at the point of measurement and more desirably from 0.5 to 5 percent of the total thickness of the molded article at the point of measurement.

Observing a cross-sectional portion of a molded article under a polarized light microscope, the effective skin layer can be distinguished from the core by the molecular orientation, and desirably, generally parallel molecular orientation of the polymer proximate to the surface of the molded article. Additionally, the molecular orientation and thickness of the effective skin layer can be related to the birefringence value of the article as measured by a Metricon Model 2010 Prism coupler.

Polymers were injection molded at temperatures between approximately 200° C. to 250° C. into bars (125 mm×12 mm×3.0 mm) and plaques (75 mm×50 mm×1.0 mm). The reflective indices (RI) were measured along the three principle axes, flow direction or machine direction (MD), transverse direction (TD) and normal direction (ND). The in-plane birefringence (IBR) and planar birefringence (PBR) can be defined by the equations:

IBR=RI(MD)−RI(TD) PBR=(RI(MD)+RI(TD))/2−RI(ND).

Additional reference information relative to birefringence, IBR and PBR appears in U.S. Pat. No. 5,385,704, which is incorporated by reference herein.

The IBR and PBR values for the polymers of Examples 4, 5 and 8 and Comparative Example 12 are listed in Table 4. These data illustrate that between 2 to 7 times higher birefringence values were obtained for Examples 4, 5 and 8 as compared to Comparative Example 12. Higher birefringence values are a further indication of a greater degree of molecular orientation at the surface of the effective skin layer.

TABLE 4

Birefringence of Inventive and Comparison Examples

| Example | In-plane Birefringence ($\times 10^{-3}$) | Planar Birefringence ($\times 10^{-3}$) |
| --- | --- | --- |
| Example 4 (tensile bar) | 13.1 | 7.60 |
| Comp. Ex. 12 (tensile bar) | 3.90 | 3.25 |
| Example 4 (plaque) | 14.5 | 7.75 |
| Example 5 (plaque) | 12.3 | 5.95 |
| Example 8 (plaque) | 8.60 | 4.25 |
| Comp. Ex. 12 (plaque) | 2.00 | 1.90 | iii. Extensional Viscosity

Melt rheology data demonstrated the enhanced melt elasticity and melt strength of the inventive copolymers as evidenced by their high recoverable compliance. This may be reinforced by extensional viscosity measurements.

The extensional viscosity data were obtained using a Rheometrics Melt Elongational Rheometer (RME) in an extensional strain mode at 160° C. The polymers were stabilized with 0.1–0.2 wt % of BHT (2,6-di tert-butyl-4-methylphenol, a common antioxidant) and molded into a rectangular specimen (60×8×2 mm). The distance between the clamps was set at 50 mm.

Details of the measurement technique are described below. The raw data are the evolution of the tensile force versus time, F(t), which are converted into extensional viscosity values. The elongational stress and elongational viscosities are given respectively by equation 1:

$$\sigma(t) = \frac{F(t)}{S(t)} \text{ and } \eta_E(t) = \frac{\sigma(t)}{\dot{\epsilon}} \quad [1]$$

where S(t) is the sample cross-section and $\dot{\epsilon}$ the elongation rate. Instead of using the command value on the instrument, the latter quantity was determined by an image analysis procedure. During homogeneous stretching conditions, the sample length increases exponentially with time. Thus, assuming iso-volume conditions (incompressible melt), S(t) follows according to equation 2:

$$S(t)=S_0 \exp(-\dot{\epsilon}t) \quad [2]$$

It is more convenient to measure the sample width l(t) during stretching. Under uniaxial deformation, it is expressed by equation 3:

$$l(t) = l_0 \exp\left(-\frac{\dot{\epsilon}t}{2}\right) \quad [3]$$

Throughout a run, a plot of $[-2 \ln (l(t)/l_0]$ as a function of time is a straight line with a slope equal to $\dot{\epsilon}$. True elongational rates were determined according to this procedure for each test.

As a caution, Equations [1]–[3] were applied only if the following two criteria were verified:

force values higher than the minimum transducer resolution (0.2 cN), and;

homogeneous deformation, i.e. no neck-in, and no deviation from linearity in the plots of $[-2 \ln (l(t)/l_0]$ vs. time.

In case of failure of any one of these criteria, the corresponding F(t) values are not converted into elongational viscosity data, as the conversion may not be reliable. It is to be noted that the second criterion is generally the most severe test of the measurements and their reliability.

For comparison, it is useful to plot the experimental data together with the predictions of linear viscoelasticity, which can be independently evaluated by strain oscillatory experiments. These experiments have been performed on a RMS800 or a SR-500 unit from Rheometric Scientific. Discrete relaxation spectra were calculated with the established method of Baumgaertel and Winter (reference: Rheol. Acta., Vol 28, 511, 1989) using Iris software. Transient elongational viscosity was then computed as 3 times the strain value using equation 4:

$$\bar{\eta}_E(t) = 3\sum_i g_i \lambda_i \left(1 - \exp\left(\frac{-t}{\lambda_i}\right)\right) \quad [4]$$

A very important feature that is obtained from extensional viscosity measurements is the attribute of strain hardening. The ratio of the extensional viscosity of the measured polymer at break to the linear viscosity, can be calculated for each of the strain rates. Stain hardening is defined when the ratio is greater than 1. Strain hardening is observed as a sudden, abrupt upswing of the elongational viscosity in the elongational viscosity vs. time plot. This abrupt upswing, away from the behavior of a linear viscoelastic material, was reported in the 1960s for LDPE (reference: J.Meissner, Rheol. Acta., Vol 8, 78, 1969) and was attributed to the presence of long branches in the polymer.

Figure 4:
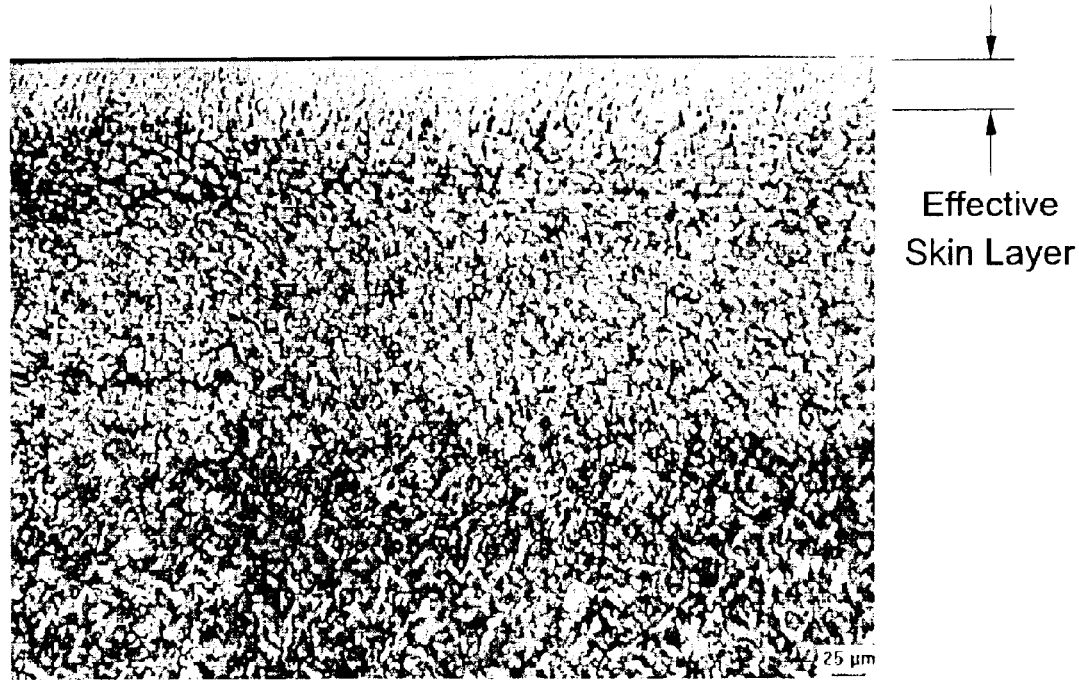
FIG. 4 is a micrograph of a partial cross-section of a molded specimen formed from the comparative polymer of Example 11.
Figure 5A:
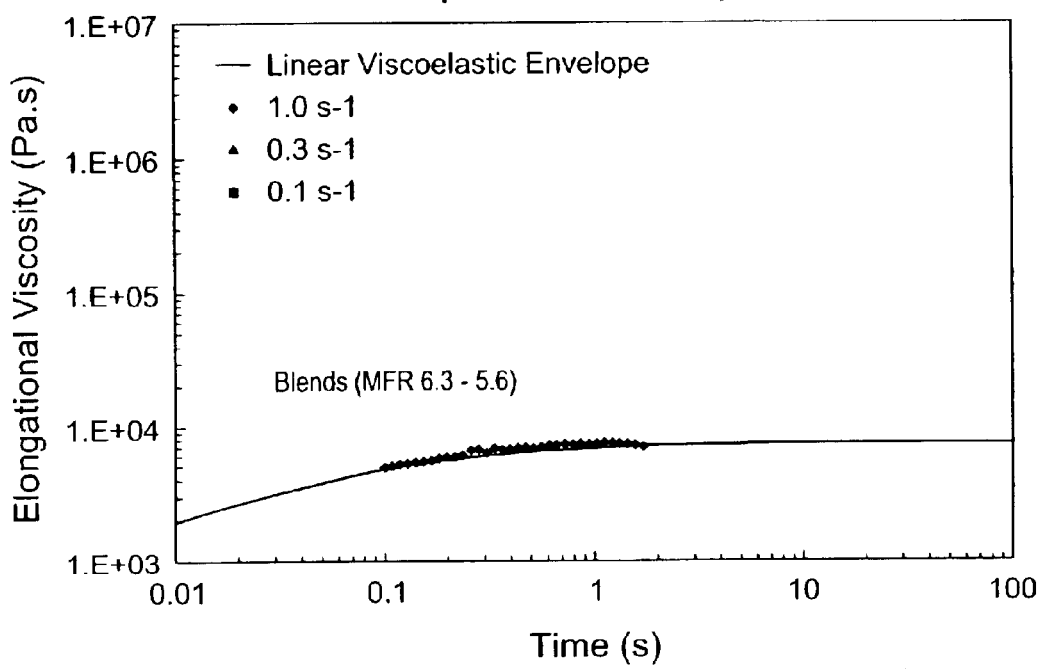
FIG. 5 is a graph plotting extensional viscosity values (at different shear rates) for the polymers formed in Examples 3, 4, 5, 7 and Comparative Example 12.
Figure 5B:
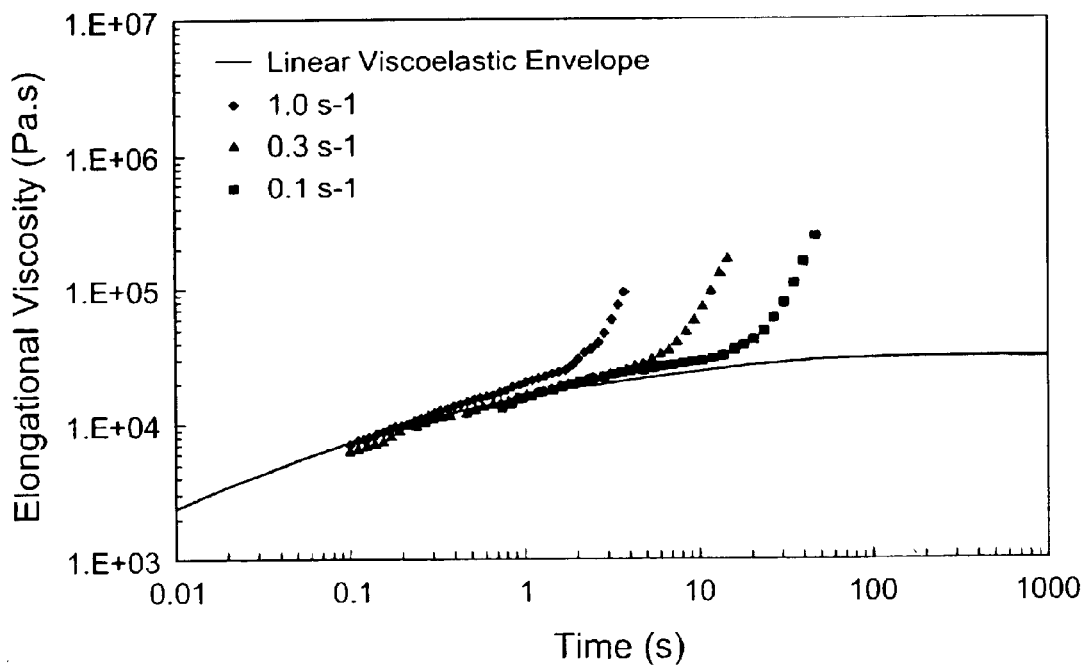
Figure 5C:
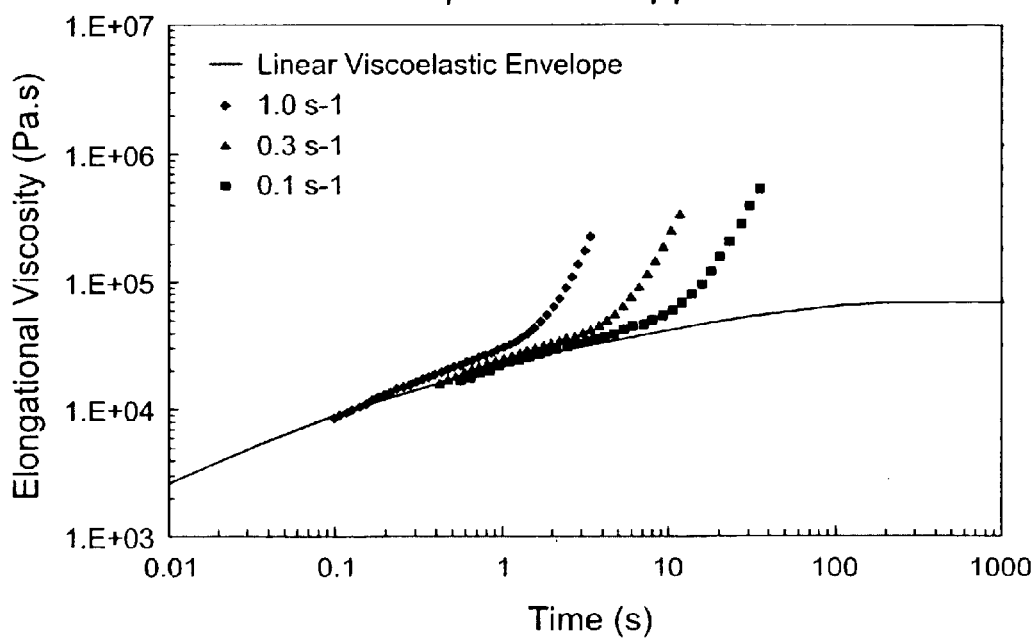
Figure 5D:
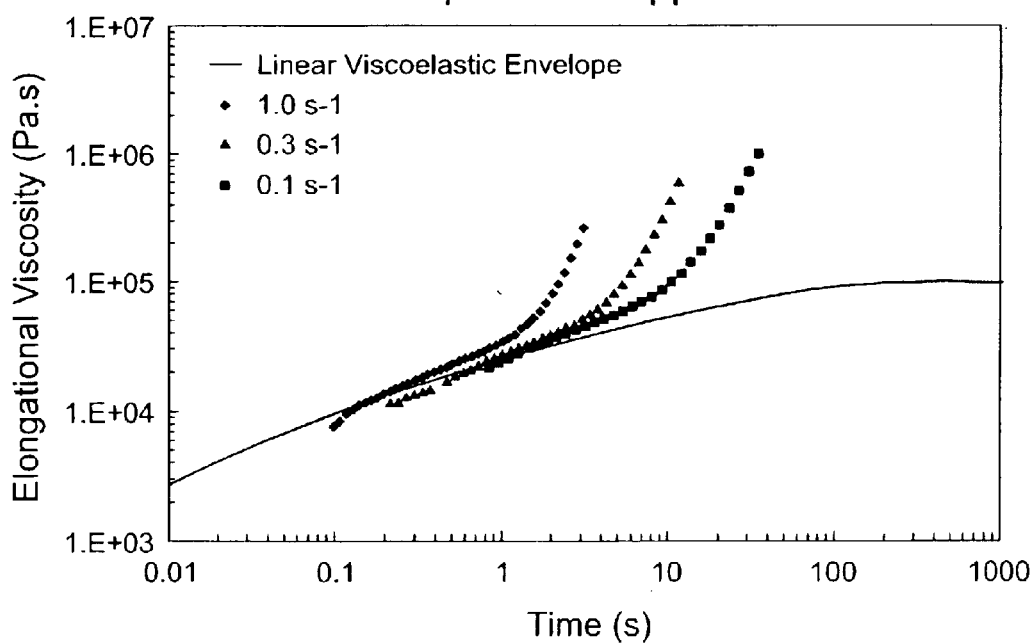
Figure 5E:
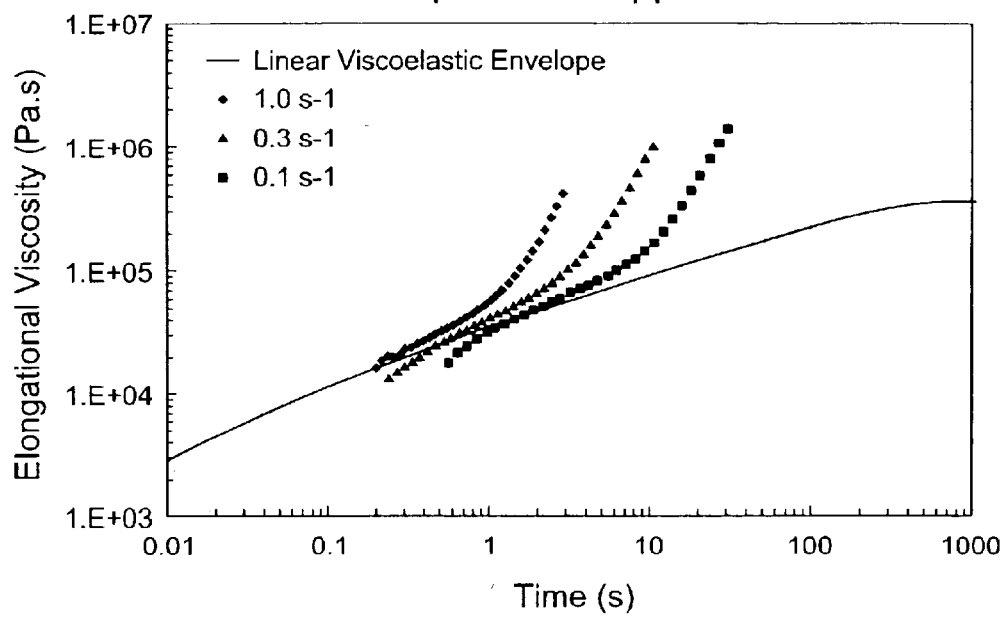

The data plots for the inventive copolymers (Examples 3, 4, 5, 7) and corresponding control (Comparative Example 12) are shown in FIG. 4. By way of illustration, inventive copolymer Example 4 shows a ratio of extensional viscosity at break to linear viscosity of 8.45 at a strain rate of 0.1 second$^{-1}$. For a strain rate of 0.3 second$^{-1}$, the ratio is 6.47. For a strain rate of 1.0 second$^{-1}$, the ratio is 4.47. For the control (Comparative Example 12), the extensional viscosity is seen to track the linear viscoelastic data with no upswing through the point of break (i.e. no strain hardening). The data plots once again demonstrate melt viscosity differences between the inventive and comparative examples. The comparative polymers did not show strain hardening and behaved as linear viscoelastic materials. The different behavior displayed by the inventive copolymers is quite clearly a result of their different composition and molecular architectures.

iv. Fibers and Fabrics

The propylene/1,9-decadiene copolymer of Example 3 was used to fabricate fibers. Melt homogenized blends of Example 3 (at 5, 10, 20 and 40%) in ACHIEVE™ 3825 (32 MFR; metallocene-based linear homopolymer; commercially available from ExxonMobil Chemical Co., Houston, Tex.) were prepared on a Werner-Pfleiderer twin screw compounding extruder (ZSK 57; twin co-rotating screws 57 mm diameter). An additive package of 1000 ppm Irganox 1076 (Ciba Geigy Corp) and 250 ppm calcium stearate (Witco Chemical) was dry blended in to each resin mix prior to melt compounding. Characterization data on the blends is shown below in Table 5.

ACHIEVE 3825 and ACHIEVE™ 3854 (24 MFR; metallocene-based linear homopolymer; commercially available from ExxonMobil Chemical Co., Houston, Tex.) were used as comparators in this study. These two resins are widely used and accepted in the polypropylene textiles market.

TABLE 5

Characterization Data on Blends of Example 3 with ACHIEVE 3825

| Product Description | MFR (dg/min) | DSC Tm (° C.) | DSC Tc (° C.) | Recov Compliance Jo ($\times 10^{-5}$ cm$^2$/dyne) |
|---|---|---|---|---|
| 5% Example 3 in 3825 | 32 | 151.1 | 115.0 | 0.81 |
| 10% Example 3 in 3825 | 31.1 | 150.9 | 116.4 | 0.86 |
| 20% Example 3 in 3825 | 29.5 | 151.4 | 117.0 | 1.57 |
| 40% Example 3 in 3825 | 22 | 151.6 | 118.0 | 2.36 |
| Example 3 | 10 | 153.4 | 120.0 | 4.85 |
| ACHIEVE ™ 3825 | 32 | 148.4 | 105.5 | 0.59 |
| ACHIEVE ™ 3854 | 24 | 148.7 | 106.9 | 0.47 |

The data in Table 5 show that low levels of invention polymer addition to linear homopolymer polypropylene influence crystallization substantially. Just 5% addition of Example 3 to ACHIEVE 3825 increases the crystallization temperature Tc from 105.5° C. to 115° C. Also, the recoverable compliance increases linearly with Example 3 addition, going from about 0.59×10$^{-5}$ cm$^2$/dyne for neat ACHIEVE 3825 to about 4.8×10$^{-5}$ cm$^2$/dyne at 40% addition of Example 3 copolymer. Since high values of recoverable compliance are not favorable for good fiber spinning performance (from prior experience, about 2.0×10$^{-5}$ cm$^2$/dyne maximum appears to be the cut-off for good spinnability), only the 5, 10 and 20% blends were fabricated into fibers, along with the controls 3825 and 3854.

The production of fibers from base polymers can roughly be divided into five steps: compounding the polymer(s), to homogenize and add ingredients like pigments and stabilizers; melting the polymer in an extruder; pressurizing the polymer melt through spinneret orifices; elongating the molten polymer fibers; solidifying the fibers by controlled cooling and collecting the fibers. Several secondary operations (like additional drawing, texturizing, staple cutting, etc) are frequently conducted on the solidified fibers.

The propylene polymer products described above were tested on a fiber line to make partially oriented yarns (POY). The POY line employed, an ExxonMobil-built apparatus, is a model of the top end of a spunbonded non-wovens process. Resin is extruded through a spinneret (a 72 hole spin pack) and taken up with a high speed winder. The output is about 0.6 g/hole/min. In this process almost all of the draw occurs in the melt phase. Yarns were made at increasing take-up rates, up to break. The processing data is summarized in Table 6 below.

TABLE 6

Processing Data on Partially Oriented Yarns

| Prod Descrip. | MFR (dg/min) | Melt T (° C.) | Quench Air T (° C.) | Speed at break (m/min) |
|---|---|---|---|---|
| 5% Ex. 3 in 3825 | 32 | 232 | 15 | 3560 |
| 10% Ex. 3 in 3825 | 31.1 | 232 | 17 | 1880 |
| 20% Ex. 3 in 3825 | 29.5 | 232 | 15 | 1795 |
| ACHIEVE 3825 | 32 | 232 | 16 | 4875 |
| ACHIEVE 3854 | 24 | 232 | 12 | 4560 |

The processing data show that generally only low levels of branched polypropylene can be used, before the spinnability is negatively impacted. 5% addition of Example 3 showed good spinnability with a respectable speed at break. Incorporation levels for Example 3 of 10% and higher were not favorable.

The birefringence values (using polarized light microscopy) for the yarns from the different polymers are shown in FIG. 5. From Table 5 it was seen that as little as 5% addition of Example 3 in ACHIEVE 3825 causes an increase in the crystallization temperature, Tc, of about 10° C. (105.5 to 115° C.). Since almost all of the draw imparted to the fibers occurs in the melt phase, a situation that causes an increase in Tc will result in less orientation and consequently lower fiber birefringence, as is observed in FIG. 5.

Figure 6:
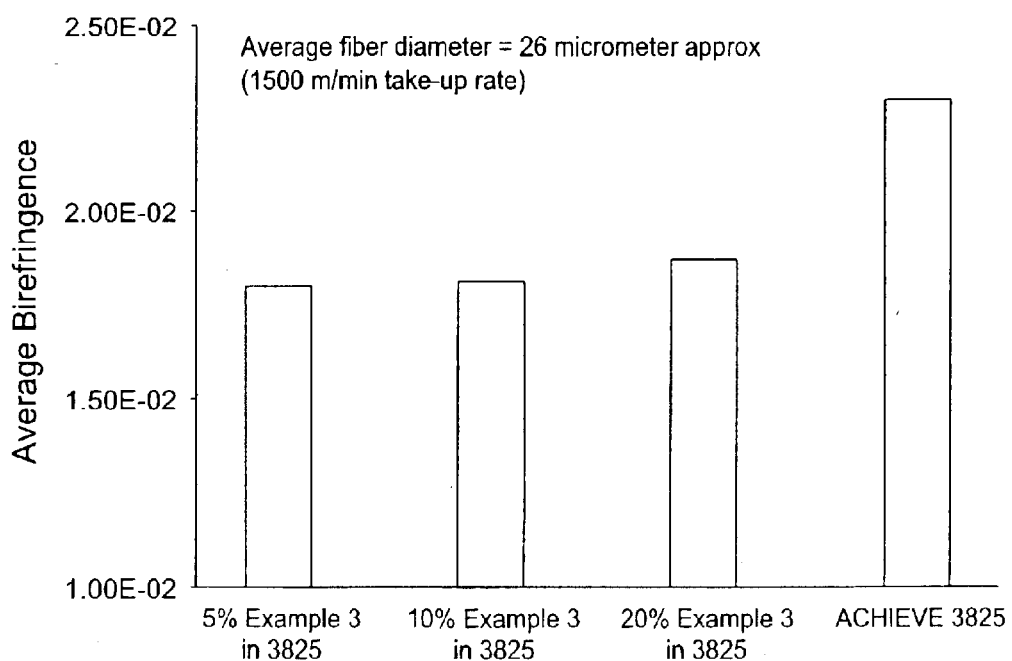
FIG. 6 plots the average birefringence values for partially oriented yarns from blends of Example 3 in ACHIEVE™ 3825 and neat 3825

Tensile testing (using a Textechno Statimat M tester) was conducted on the fibers from the POY apparatus. The tenacity and elongation data are shown in FIG. 6. It is seen that the yarn elongation of ACHIEVE 3825 improves with low levels of addition of Example 3. There is a substantially greater boost going from neat 3825 to 5% Example 3 addition, than there is going from 5% addition to 20% addition. Improved fiber elongation is a highly desired attribute in many applications. The fiber strength values show a decrease with low levels of addition of Example 3; blending the invention Example 3 into ACHIEVE 3825 has created a different balance of yarn strength to elongation. More generally, the addition of low levels (under 10%; typically 5%) of the invention polymers to linear polypropylene allows the manipulation of fiber crystallization and orientation to obtain different fiber property profiles. Partially oriented yarns with high fiber elongation can be obtained. If higher tenacities are desired, an additional drawing step can be performed to achieve the target. At these low levels of addition (under 10%; typically 5%) good spinnability and respectable speed-to-break levels are maintained.

This broader envelope of fiber product properties brought out by blends of the invention polymers is also anticipated during the making of fabrics (e.g. spunbonded non-wovens).

v. Blow Molded Bottles

The propylene/1,9-decadiene copolymer of Example 7 was used to fabricate 1 gallon industrial round bottles via blow molding. Pellets of neat Example 7 and of a 50/50 melt homogenized blend of Example 7 and Example 15 were prepared on a Werner-Pfleiderer twin screw compounding extruder (ZSK 57; twin co-rotating screws 57 mm diameter). An additive package of 1000 ppm Ethanox 330 (Ethyl Corp), 1500 ppm Irgafos 168 (Ciba Geigy Corp) and 600 ppm calcium stearate (Witco Chemical) was dry blended in to each resin prior to melt compounding. In addition, commercial products PP9122 random copolymer (2.1 MFR, 2.1% $C_2$ comonomer) and PP 7031 E7 impact copolymer (0.35 MFR, 9.0% total $C_2$ comonomer), both from Exxon-Mobil Chemical Co., Houston, Tex., were used as controls.

The above polymers were molded on a UNILOY 2-head reciprocating blow molding machine. A 1 gal industrial round bottle tool was used. This mold offers a large bottle (about 115 g bottle weight) with a comparatively coming plex design involving a built-in handle and changes in diameter along the length of the bottle. A summary of the process conditions used on the UNILOY machine is shown in Table 7 below.

TABLE 7

Processing Data on UNILOY Blow Molding Machine

| | PP9122 | Examples 7 + 15 (50/50 blend) | Example 7 | PP 7031 E7 | PP 7031 E7 + Example 7 (80/20 blend) |
|---|---|---|---|---|---|
| Feed zone (° C.) | 182 | 171 | 171 | 188 | 188 |
| Transition zone (° C.) | 193 | 182 | 182 | 204 | 204 |
| Metering zone (° C.) | 193 | 182 | 182 | 204 | 204 |
| Control block (° C.) | 199 | 196 | 196 | 210 | 210 |
| Head 1 (° C.) | 199 | 196 | 196 | 210 | 210 |
| Head 2 (° C.) | 199 | 196 | 196 | 210 | 210 |
| Stock Temp (° C.) | 189 | 187 | 185 | 201 | 200 |
| Parison Temp (° C.) (head 1/head 2) | ** | 193/197 | 185/189 | 219/219 | 213/216 |
| Parison wt setting (%) (head 1/head 2) | 0.1/2.2 | 7.75/9.75 | 3.45/6.0 | 4.8/7.3 | 2.5/5.2 |
| Profile type | flat | flat | flat | flat | flat |
| Programming (head 1/head 2) | no | no | no | no | no |
| Parison wt (g) | 230/210 | 176/177 | 167/165 | 185/185 | 182/186 |
| Bottle wt (g) | ** | 118/115 | 114/114 | 117/116 | 116/116 |
| Cycle time (s) (head 1/head 2) | 23 | 24.6 | 19 | 22.6 | 20 |
| High pressure blow (psi) | 100 | 75 | 80 | 80 | 80 |
| Low pressure blow (psi) | 20 | 20 | 20 | 20 | 20 |

**did not measure; unable to line out

Figure 7A:
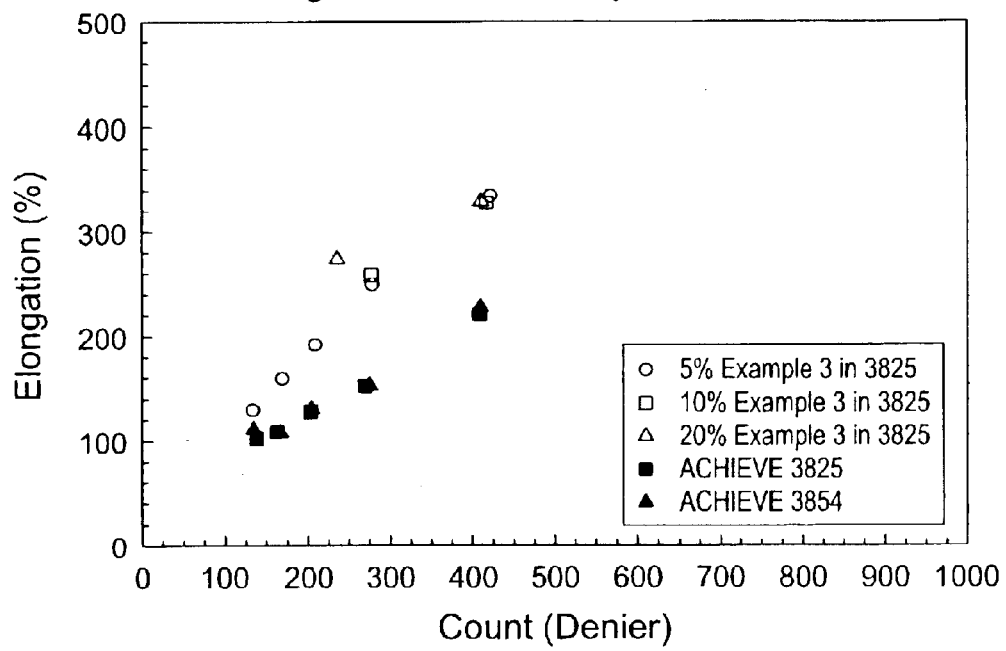
FIG. 7 plots the break elongation and tenacity values (versus denier count and take-up rate) for the partially oriented yarns from blends of Example 3 in ACHIEVE™ 3825 and neat 3825.
Figure 7B:
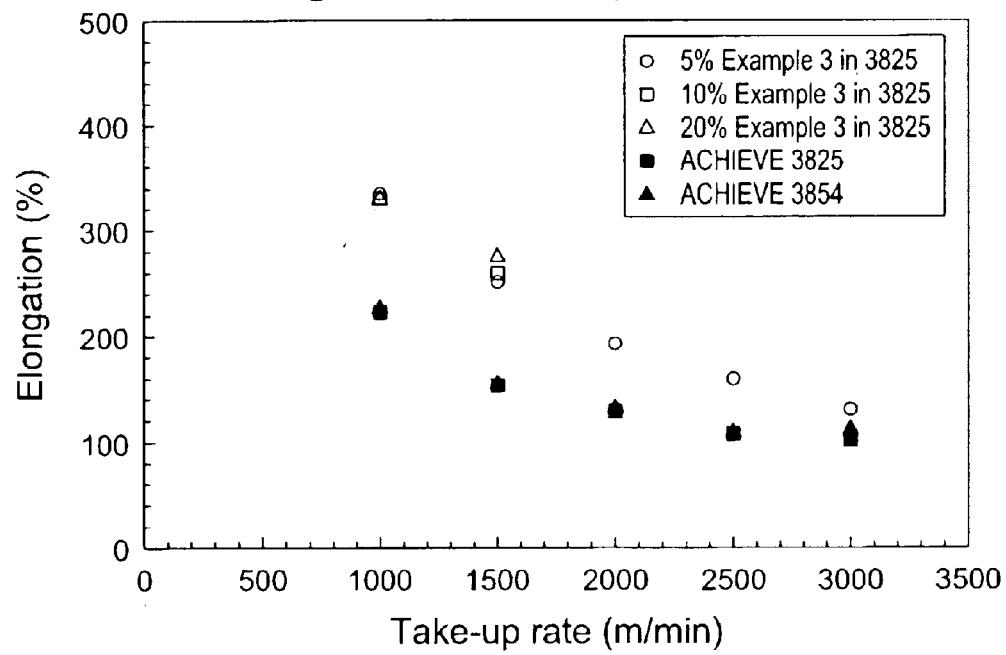

The blow molding processabilities of the different resins were as follows: The random copolymer PP9122 did not blow mold well. It was not possible to obtain lined-out conditions. The material showed high stickiness and also high swell. The impact copolymer PP 7031 E7 showed good moldability, allowing the establishment of a continuous lined-out operation. Invention polymer Example 7 (at an MFR of ~2.0 dl/g versus 0.35 dl/g for PP 7031 E7) also showed good molding processability (both neat and a 50/50 blend with Comparative Example 15) with continuous lined-out operation. The bottles from Example 7 showed good definition at critical locations, like the built-in handle. The overall appearance was good, though the inside wall surface showed some distortions. This is believed to be a rheological effect that can be controlled through optimization of the degree of branching. An on-line blend (dry blend fed to extruder hopper) of 80% of PP 7031 E7 and 20% of invention Example 7 worked surprisingly well. The blend processed very well with good bottle definition and good appearance. The inside surface distortions noted with neat Example 7 were no longer present. Also, the 20% addition of the invention Example 7 provided a boost to bottle rigidity and the top load performance of the bottles (per ASTM D-2659). This behavior is shown in FIG. 7.

It is seen that the high melt strength invention polymers show good blow molding processability, allowing the ~2 MFR Example 7 to provide comparable moldability to a fractional MFR conventional propylene polymer. Additionally, the enhanced level of crystallinity-related properties offered by the invention polymers translates to improved bottle top-load strength. Thus minor additions (10 to 20% blended at the molding line) to blow molding grades of conventional polypropylene (like impact copolymer PP 7031 E7) provide good moldability plus improved top load strength.

vi. Thermoformed Parts

The propylene/1,9-decadiene copolymer of Example 6 was used to fabricate medium draw food containers via thermoforming using a batch forming machine. Pellets of neat Example 6, neat Example 15, and a 50/50 melt homogenized blend of Example 6 and Example 15 were prepared on a Werner-Pfleiderer twin screw compounding extruder (ZSK 57; twin co-rotating screws 57 mm diameter). An additive package of 1000 ppm Ethanox 330 (Ethyl Corp), 1500 ppm Irgafos 168 (Ciba Geigy Corp) and 600 ppm calcium stearate (Witco Chemical) was dry blended in to each resin prior to melt compounding. The pelletized products were extruded into sheet. The line had a 1.25 inch single screw extruder and a 10 inch wide sheet die. The sheets produced had a thickness of ~20 mil. No problems were encountered extruding sheets from the three materials.

The sheets were formed into containers using a batch thermoformer (AAA shuttle machine). The equipment functioned essentially via vacuum forming (~26 in Hg); no plug assist was used during the trial. The oven heating station was operated with independent top and bottom temperature controls, the oven time was controlled by a heat cycle timer. The molding station was equipped with vacuum. The mold temperature was controlled at 121° C. The tool used was a medium draw food container mold (7.5 in×2.5 in×1.5 in). The sheets were clamped in a metal frame that shuttled between the oven and molding stations. The orientation of the sheets, relative to the clamping device, was consistent for all three materials. The sheet surface temperature, just prior to forming, was measured using an IR gun. The test scheme used involved 3 levels of oven temperature (600° F. or 316° C.; 700° F. or 371° C.; and 800° F. or 427° C.). At each oven temperature, a range of heating times was studied to determine the operating window. This was assessed via observation of the containers. The criteria used to judge the containers were wall distribution, particularly at critical locations such as corners; part definition (i.e. capability to reproduce all the details of the mold tool) and general appearance (i.e. lack of flaws—folds, ripples, etc.—from the forming operation)

Figure 8A:
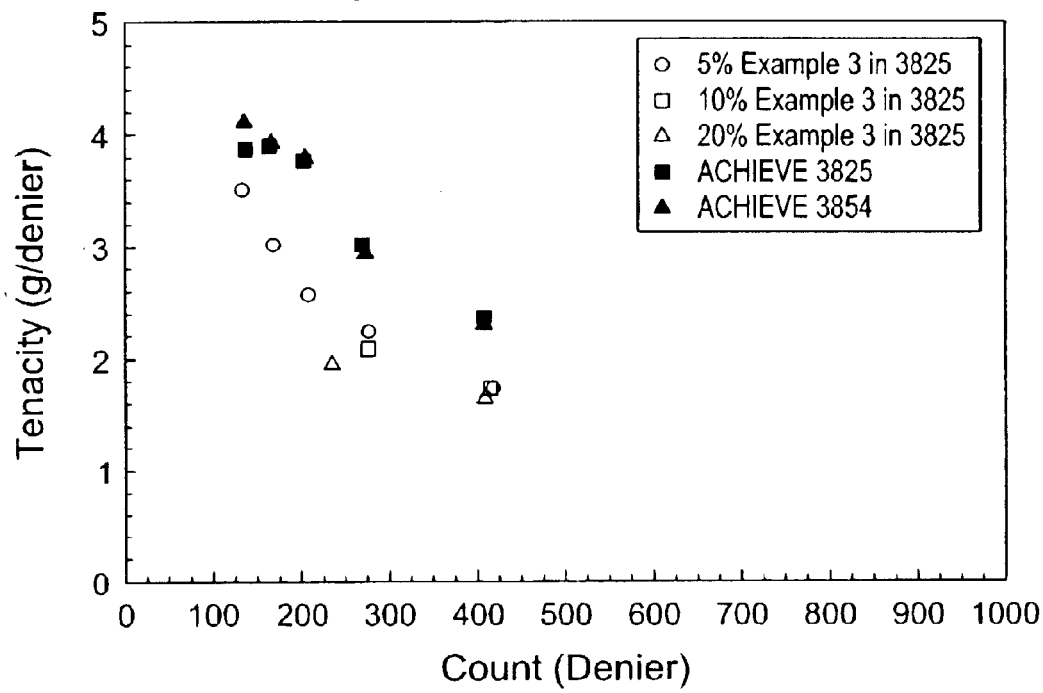
FIG. 8A Tenacity versus thread count of partially oriented yarns.
Figure 8B:
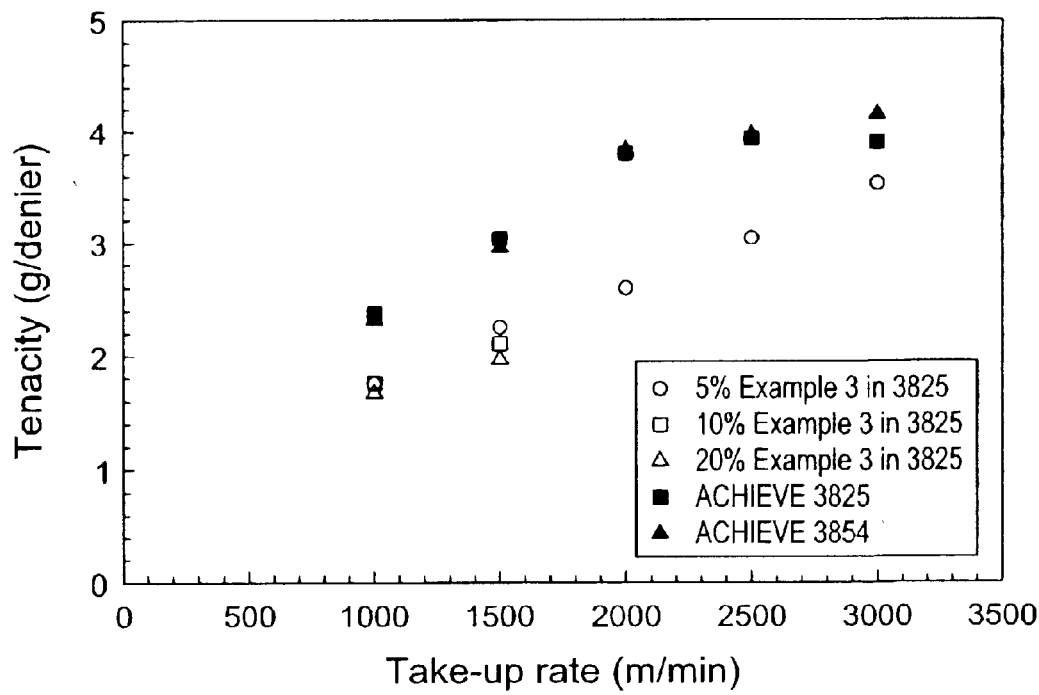
FIG. 8B Tenacity versus thread count of partially oriented yarns.

The process operating windows for the three materials at oven temperature 700° F. (371° C.) are shown in FIG. 8. The figure is a plot of oven heating time versus sheet temperature. The boxes indicate, for each material, the window within which good quality containers could be fabricated, per the criteria defined above. The window for Comparative Example 15 (linear polymer) was rather limited. The invention polymer, Example 6, showed a broader processing window. The window for the 50/50 blend product was in-between. The invention polymer with its improved melt strength, showed better sag resistance at longer oven times. This allowed operability at higher sheet temperatures than was possible with Comparative Example 15. In addition, the invention polymer sheet showed fewer ripples and folds when discharged from the oven. This improvement in sheet form led to a tighter seal during the forming operation, with consequent better part definition.

vii. Foamed Parts

The propylene/1,9-decadiene copolymers of Examples 5, 7, 9 and 10 were evaluated in a foaming operation involving chemical blowing agents. Pellets of the above invention polymers were prepared on a Warner-Pfleiderer twin screw compounding extruder (ZSK 57; twin co-rotating screws 57 mm diameter). An additive package of 500 ppm Irganox 1076 and 1000 ppm Irgafos 168 (both from Ciba Geigy Corp) was dry blended in to each resin prior to melt compounding. A commercial branched propylene polymer from Montell Polyolefins (Wilmington, Del.) identified as Pro-fax™ PF-814 was used as a comparator. This product is of nominal 3 MFR (at 230° C.) and is reported as a high melt strength polypropylene homopolymer for low density foam extrusions.

The equipment used for foaming was a Brabender coextrusion line that offered the capability to provide solid skins over each side of a foamed core. In this evaluation, only the foamed core was produced. The line had a single screw of 1.9 mm diameter and 24 L/D, and a slit die with a width of 50 mm. The chemical blowing agent used was Safoam™ FPE 50 (Reedy International Corp, Keyport, N.J.), a combination of bicarbonate of soda and citric acid. It was used at a loading of 5%. The foam processing behavior can be gauged from the data shown in Table 8 below.

TABLE 8

Foam Processing via Chemical Blowing Agent

| Product | Temperature Profile (° C.) | Die width (mm) | Screw speed (rpm) | Foam Density (g/ml) |
|---|---|---|---|---|
| Example 9 | 50/165/200/155 | 50 | 60 | 0.5 |
| Example 5 | 50/165/230/150 | 50 | 50 | 0.4 |
| Example 10 | 50/165/230/150 | 50 | 50 | 0.4 |
| Example 7 | 50/165/250/150 | 50 | 50 | 0.4 |
| PF-814 | 70/165/250/160 | 50 | 50 | 0.3 |

Figure 9:
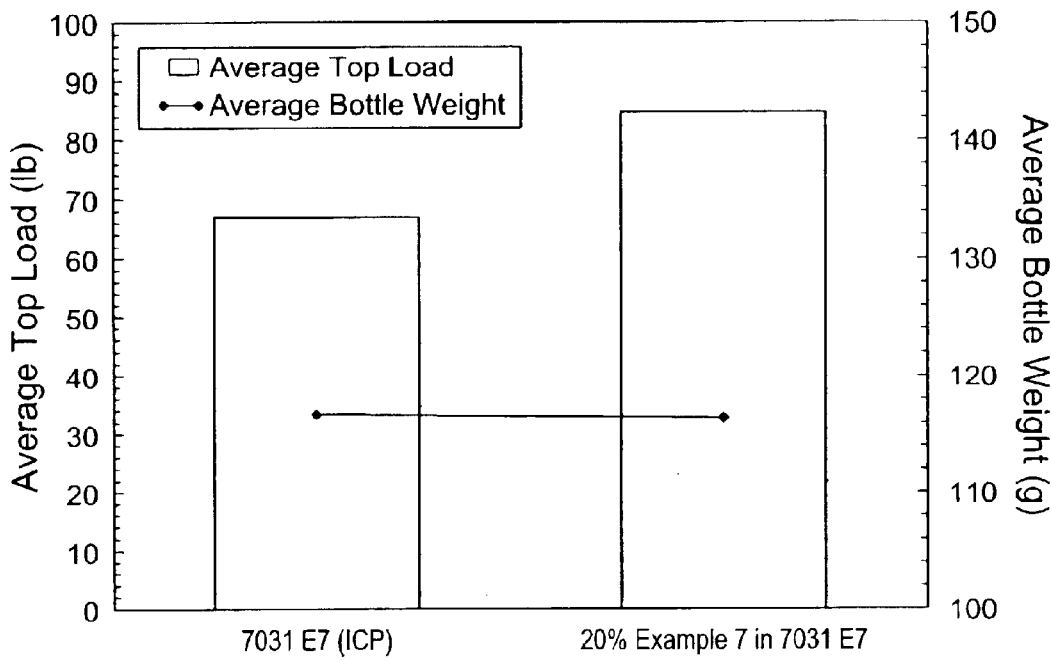
FIG. 9 plots the average top load values for blow-molded bottles from impact copolymer PP 7031 E7 and a 20% blend of Example 7 in PP 7031 E7, both at the same bottle weight.

The invention polymers gave flat foamed sheets of comparable foam density to the commercial product. The processing behavior was also comparable. In fact the invention polymers appeared to offer an advantage, in that lower die temperatures could be set. For PF-814, at die temperatures<160° C., the extrudate tended to freeze off. Good foam morphologies were obtained for all the polymers as is seen from the micrographs shown in FIG. 9. The invention polymers show foamed structures with cells of quite uniform size and shape. The cell sizes are larger for the case of PF-814, comparator resin, consistent with its slightly lower foam density (0.3 g/ml versus 0.4 g/ml for invention Examples).

Foaming experiments using carbon dioxide gas injection were conducted on invention Example 4 and the commercial branched polypropylene, PF814, as comparator. The equipment used was a Killion segmented extruder having a single screw of 32 mm diameter and 40 L/D, and a 3 mm rod die. Carbon dioxide gas was used as blowing agent. Up to 800 psi was achieved through use of a gas cylinder; a booster was used to provide pressures>800 psi. Safoam™ FPE 50 was used as a bubble nucleating agent at a loading of 0.5%. Key processing data are shown in Table 9 below.

TABLE 9

Foam Processing via Carbon dioxide Blowing Agent

| Gas flow rate (scc/min) | Gas pressure (psi) | Die pressure (psi) | Melt temp (° C.) | Foam Density (g/ml) |
|---|---|---|---|---|
| Example 4 + Safoam FPE 50 (99.5 : 0.5) | | | | |
| 0 | 0 | — | — | 0.9 |
| 28.9 | 51 | 243 | 162.9 | 0.5 |
| 67.1 | 99 | 328 | 152.4 | 0.25 |
| 157.4 | 181 | 488 | 150.9 | 0.18 |
| 140.4 | 300 | 562 | 145.7 | 0.11 |
| 164.9 | 397 | 736 | 145.2 | 0.09 |

TABLE 9-continued

Foam Processing via Carbon dioxide Blowing Agent

| Gas flow rate (scc/min) | Gas pressure (psi) | Die pressure (psi) | Melt temp (° C.) | Foam Density (g/ml) |
|---|---|---|---|---|
| PF-814 + Safoam FPE 50 (99.5 : 0.5) | | | | |
| 0 | 0 | — | — | 0.9 |
| 18.8 | 53 | 333 | 160 | 0.45 |
| 116.4 | 111 | 317 | 157.1 | 0.2 |
| 121.5 | 202 | 684 | 152.7 | 0.12 |
| unstable | 300 | 800 | 151.8 | 0.09 |

Figure 10:
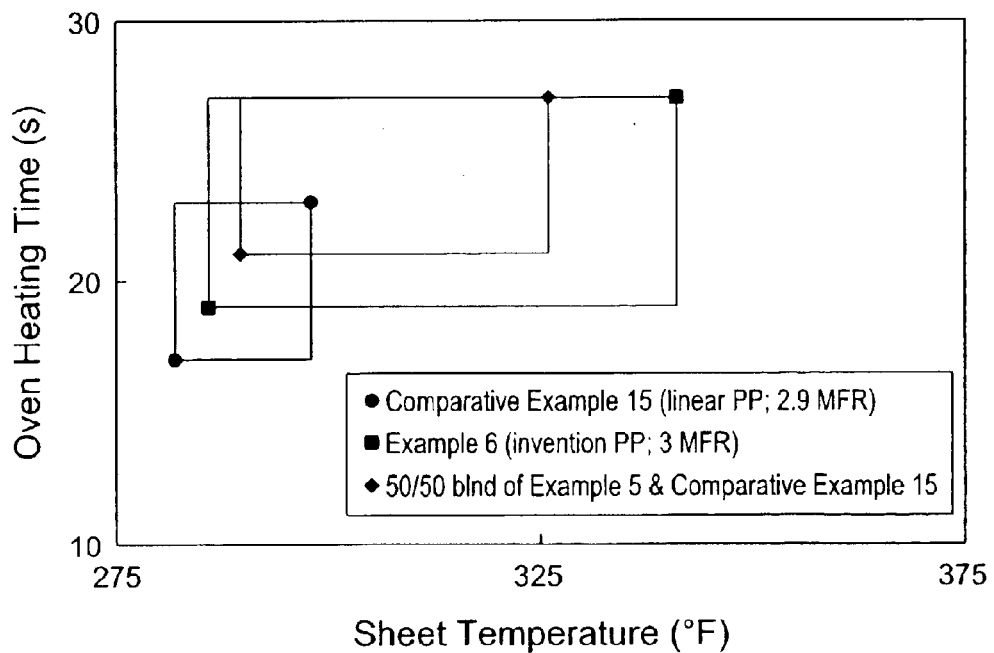
FIG. 10 plots the thermoforming processing window at 371° C. (or 700° F.) oven temperature for medium-draw food containers from Example 6, Comparative Example 15 and a 50/50 blend of the two.
Figure 11:
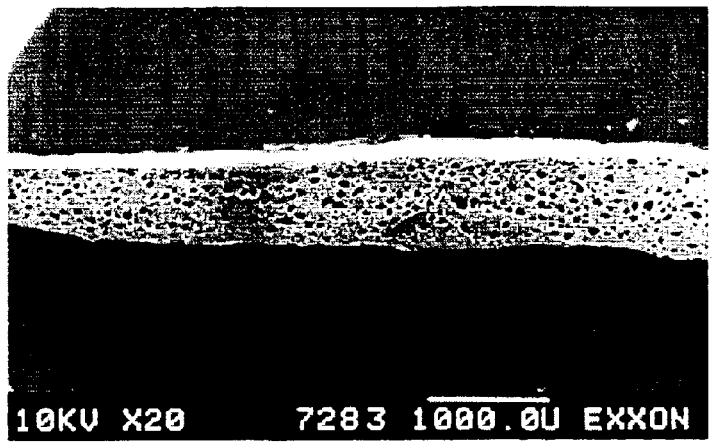
FIG. 11 shows micrographs of the cellular morphologies of flat foamed sheets from Examples 10, 7 and comparative resin PF-814 (commercial product from Montell), using a chemical blowing agent.
Figure 11:
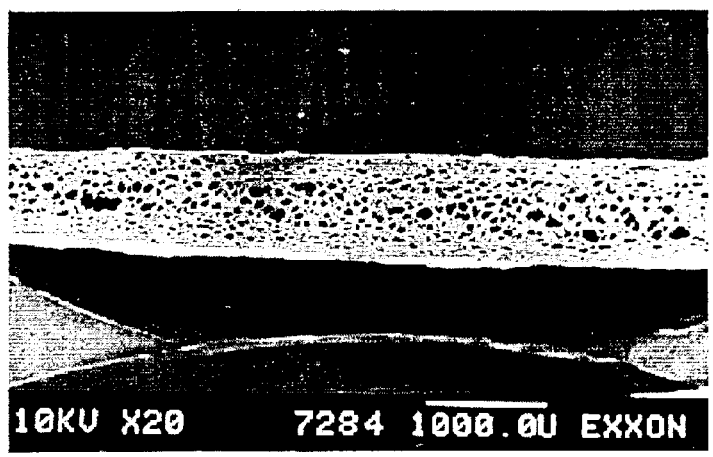
Figure 11:
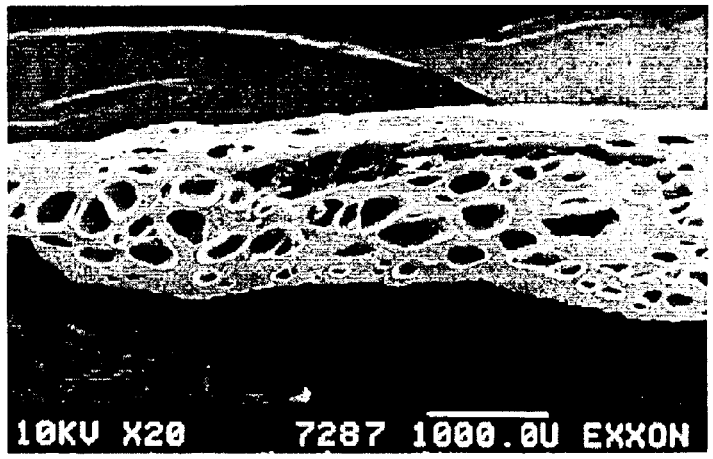

Additional data correlations are shown in FIG. 10. The data indicate that per the testing conditions used, both products attain a comparably low foam density, which is desirable. The foam processing of invention polymer Example 4 appears similar to the comparator resin, commercial polymer PF-814. As was noted previously with foamed profiles from chemical blowing agents, it appears that the invention polymers can be processed at lower melt temperatures (for the same foam density), which is advantageous. The foam morphologies from both resins show good closed cell structures, as is seen from the micrographs shown in FIG. 11.

viii. Thermoplastic Olefin Compositions (TPOs)

TPO compositions typically consist of a homogeneous blend of isotactic polypropylene with a rubber (e.g. EP or EPDM rubber). The invention Examples were used to prepare TPOs, with the polypropylene being the major component and the rubber being the dispersed, minor component. Examples 3, 4, 5 and 7, along with Comparative Example 12 (linear polymer, no diene) were compounded with EP rubber at levels up to 20% rubber. The EP grade used was VISTALON™ 457 (29 Mooney, 48% $C_2$, Mw 150 k, Mw/Mn 2.1, Tg~−55° C.). This product, obtained from ExxonMobil Chemical Co., Houston, Tex., is widely used in the TPO business as a modifier. The composition details are shown in Table 10 below.

Figure 12:
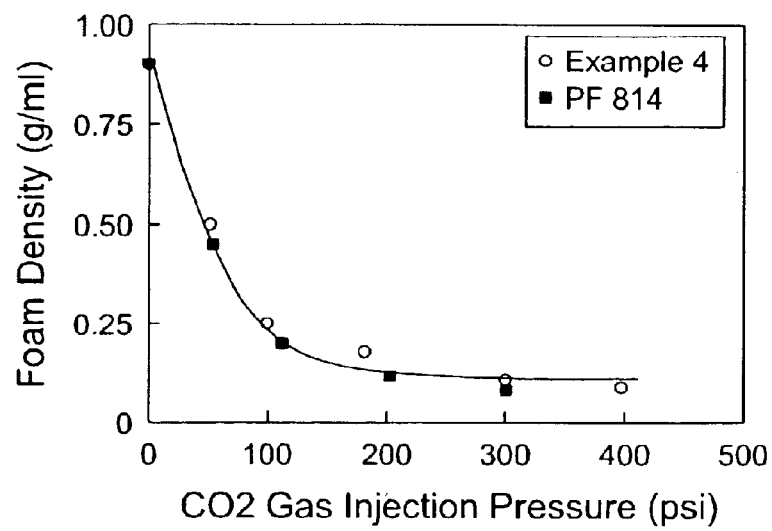
FIG. 12 plots foam processing parameters during the production of foamed profiles from Example 4 and comparative resin PF-814 (commercial product from Montell), using carbon dioxide gas injection.
Figure 12:
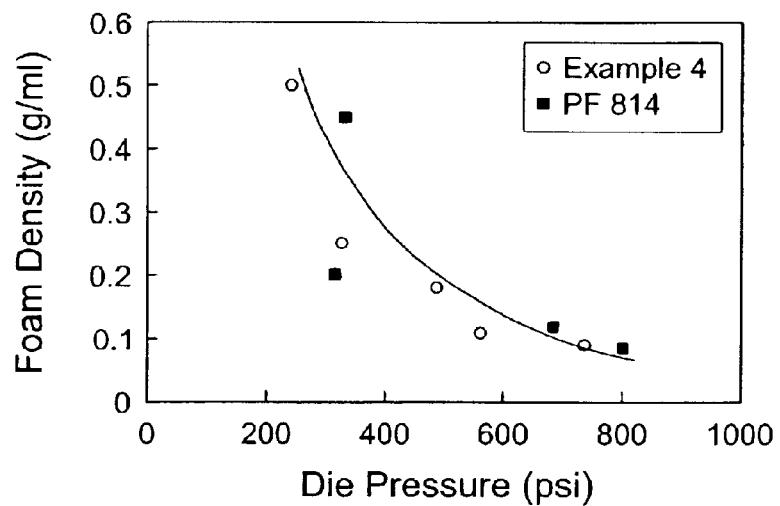
Figure 12:
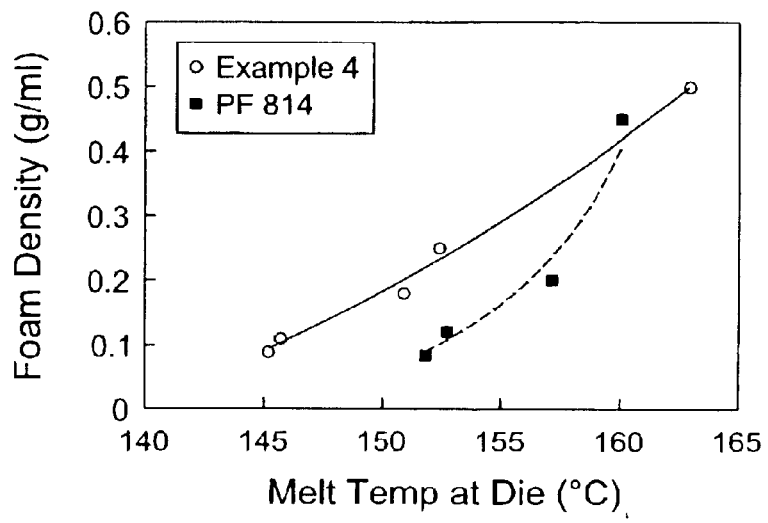

A total of 25 sample blends were prepared. The compounding involved dry blending the ingredients of each sample, followed by melt homogenization of ~5 lb batches on a Farrell OOC Banbury mixer. The mixing temperature used was in the range 188 to 216° C. The polypropylene was added first to the mixer and fully fluxed, after which the other ingredients (rubber modifier, extra stabilizers) were incorporated. Mixing was done for 3 minutes at low rotor speed, followed by an additional 3 minutes at high rotor speed. The compounded mix was then dumped and collected in chunks. After cooling, the chunks were ground (to ~1 mm size) using an IMS grinder (Model 2069-SP). The ground product was extruded on a Warner-Pfleiderer twin-screw extruder (ZSK 57, twin co-rotating screws 57 mm diameter), into pellets. The pelletized products were injection molded into ASTM parts, on a 75 Ton Van Dom injection press. The molded part property data are shown in Table 11 below. The measurements involved tensile properties (ASTM D-638), flexural properties (ASTM D-790), Gardner impact (ASTM D-5420) and notched Izod impact (ASTM D-256). Additional data plots are shown in FIG. 12. The plot of modulus versus rubber content shows the invention Example 5 to have a higher modulus than Comparative Example 12 (no diene control) for a given rubber content, which is advantageous. Also in FIG. 12 is a plot of notched Izod impact (at 23° C.) versus compound MFR, for the different polymer blends. For Comparative Example 12 (no diene control) the MFR decreases on adding rubber, however the impact improvement is marginal at best. The invention Examples show a much lower decrease in MFR, and a substantial enhancement in impact strength. At corresponding levels of rubber incorporation, the impact value increases by a factor of 3 to 10, versus the control (Comparative Example 12). Finally, FIG. 12 also shows the balance between stiffness and impact. Blends based on Comparative Example 12, the no diene control, show a steep drop-off in modulus with rubber addition, with little enhancement in impact strength. The invention Example blends show a more gradual decrease in stiffness and a fairly substantial gain in impact strength. The balance between stiffness and impact for the invention polymers improves up to a point; beyond a certain diene level, the same trend line is obtained (Examples 4,5 and 7).

TABLE 10

TPO Blend Compositions[1]

| | Sample ID | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Comp Ex 12 | 100 | 97.5 | 95 | 90 | 80 | 0 | 0 | 0 | 0 | 0 | 0 | 0 | 0 |
| Example 3 | 0 | 0 | 0 | 0 | 0 | 100 | 97.5 | 95 | 90 | 80 | 0 | 0 | 0 |
| Example 4 | 0 | 0 | 0 | 0 | 0 | 0 | 0 | 0 | 0 | 0 | 100 | 97.5 | 95 |
| Example 5 | 0 | 0 | 0 | 0 | 0 | 0 | 0 | 0 | 0 | 0 | 0 | 0 | 0 |
| Example 7 | 0 | 0 | 0 | 0 | 0 | 0 | 0 | 0 | 0 | 0 | 0 | 0 | 0 |
| VISTALON-457 | 0 | 2.5 | 5 | 10 | 20 | 0 | 2.5 | 5 | 10 | 20 | 0 | 2.5 | 5 |

| | Sample ID | | | | | | | | | | | |
|---|---|---|---|---|---|---|---|---|---|---|---|---|
| | 14 | 15 | 16 | 17 | 18 | 19 | 20 | 21 | 22 | 22 | 24 | 25 |
| Comp Ex 12 | 0 | 0 | 0 | 0 | 0 | 0 | 0 | 0 | 0 | 0 | 0 | 0 |
| Example 3 | 0 | 0 | 0 | 0 | 0 | 0 | 0 | 0 | 0 | 0 | 0 | 0 |
| Example 4 | 90 | 80 | 0 | 0 | 0 | 0 | 0 | 0 | 0 | 0 | 0 | 0 |
| Example 5 | 0 | 0 | 100 | 97.5 | 95 | 90 | 80 | 0 | 0 | 0 | 0 | 0 |
| Example 7 | 0 | 0 | 0 | 0 | 0 | 0 | 0 | 100 | 97.5 | 95 | 90 | 80 |
| VISTALON-457 | 10 | 20 | 0 | 2.5 | 5 | 10 | 20 | 0 | 2.5 | 5 | 10 | 20 |

[1]Blended in Banbury; all samples contain 400 ppm of Ethanox 330, 400 ppm of Irgafos 168, and 400 ppm of calcium stearate.

TABLE 11

Properties of TPO Blend Compositions
(sample compositions in Table 10)

| | Sample ID | | | | | | | | | | | | |
|---|---|---|---|---|---|---|---|---|---|---|---|---|---|
| | 001 | 002 | 003 | 004 | 005 | 006 | 007 | 008 | 009 | 010 | 011 | 012 | 013 |
| MFR (@ 230° C.) | 19.1 | 19.4 | 19.1 | 16.3 | 13.0 | 11.1 | 10.4 | 10.0 | 8.9 | 8.6 | 6.3 | 6.1 | 6.0 |
| DSC (10° C./min) | | | | | | | | | | | | | |
| Tm (° C., 1st) | 153.8 | 153.8 | 153.1 | 153.6 | 153.0 | 152.6 | 151.3 | 151.3 | 152.6 | 150.4 | 151.5 | 150.7 | 151.6 |
| $_\Delta$Hm (J/g, 1st) | 96.1 | 90.8 | 92.9 | 91.6 | 79.3 | 97.5 | 92.5 | 93.8 | 90.8 | 80.0 | 92.7 | 95.3 | 96.4 |
| Tc (° C., 1st) | 114.1 | 114.2 | 114.3 | 113.8 | 114.0 | 119.8 | 119.0 | 119.3 | 119.3 | 118.2 | 121.1 | 121.0 | 121.2 |
| $_\Delta$Hc (J/g, 1st) | 98.9 | 99.2 | 97.3 | 92.7 | 80.4 | 101.0 | 96.9 | 98.2 | 90.4 | 81.3 | 100.5 | 98.2 | 98.3 |
| Tm (° C., 2nd) | 152.6 | 152.4 | 152.6 | 152.7 | 152.2 | 153.3 | 153.2 | 153.3 | 153.2 | 152.8 | 154.0 | 153.5 | 153.6 |
| $_\Delta$Hm (J/g, 2nd) | 105.9 | 106.9 | 104.4 | 99.5 | 82.9 | 109.2 | 104.1 | 104.5 | 99.9 | 84.8 | 107.3 | 106.7 | 105.2 |
| Tensile | | | | | | | | | | | | | |
| stress @ yield (psi) | 5110 | 4930 | 4760 | 4230 | 3230 | 5390 | 5120 | 4850 | 4260 | 3270 | 5380 | 5160 | 4960 |
| strain @ yield (%) | 7.7 | 7.8 | 7.8 | 7.5 | 8.0 | 7.3 | 7.5 | 7.2 | 7.8 | 8.7 | 7.6 | 7.2 | 7.6 |
| break stress (psi) | 4100 | 2630 | 2810 | 2120 | 2510 | 3170 | 2730 | 2260 | 2020 | 3200 | 3130 | 2740 | 2240 |
| break strain (%) | 240 | 320 | 370 | 390 | 880 | 340 | 320 | 210 | 230 | 1000 | 370 | 250 | 220 |
| Y. mod. (MPa) | 2040 | 1960 | 1690 | 1750 | 1260 | 2120 | 2100 | 1930 | 1980 | 1320 | 2230 | 2120 | 2160 |
| Flex | | | | | | | | | | | | | |
| tan. mod. (kpsi) | 223 | 218 | 210 | 191 | 143 | 260 | 246 | 242 | 220 | 148 | 279 | 263 | 248 |
| mod. sec. 1% (kpsi) | 216 | 212 | 203 | 185 | 139 | 251 | 238 | 233 | 212 | 144 | 270 | 254 | 238 |
| Gardner Impact (−29° C.)* | | | | | | | | | | | | | |
| energy (in · lb) | <8 | <8 | 13.3 | 45.2 | 180.0 | <8 | <8 | <8 | <8 | 223.3 | <8 | <8 | <8 |
| type of failure | 5s | 5s | 8s, 5d/b | 14s, 5d/b | 6s, 3d, 8d/b | 5s | 5s | 5s | 5s | 4s, 4d, 4d/b | 5s | 5s | 5s |
| Notched Izod Test, Resilience (ft-lb/inch) | | | | | | | | | | | | | |
| [23° C.] | 0.50 | 0.58 | 0.67 | 0.80 | 1.47 | 0.58 | 0.70 | 0.82 | 1.19 | 2.91 | 0.61 | 0.76 | 1.04 |
| [−18° C.] | 0.36 | 0.38 | 0.36 | 0.40 | 0.69 | 0.36 | 0.37 | 0.37 | 0.39 | 0.80 | 0.35 | 0.35 | 0.36 |
| [−29° C.] | 0.36 | 0.36 | 0.37 | 0.43 | 0.69 | 0.37 | 0.38 | 0.39 | 0.39 | 0.78 | 0.39 | 0.37 | 0.37 |

| | Sample ID | | | | | | | | | | | |
|---|---|---|---|---|---|---|---|---|---|---|---|---|
| | 014 | 015 | 016 | 017 | 018 | 019 | 020 | 021 | 022 | 023 | 024 | 025 |
| MFR (@ 230° C.) | 5.6 | 5.8 | 5.3 | 5.3 | 5.0 | 4.9 | 4.8 | 3.9 | 4.4 | 3.4 | 3.5 | 3.8 |
| DSC (10° C./min) | | | | | | | | | | | | |
| Tm (° C., 1st) | 151.0 | 150.7 | 151.3 | 151.0 | 151.5 | 151.0 | 150.9 | 150.7 | 150.6 | 150.6 | 150.1 | 150.2 |
| $_\Delta$Hm (J/g, 1st) | 90.6 | 78.0 | 98.3 | 95.4 | 94.1 | 90.5 | 80.0 | 97.8 | 97.1 | 90.3 | 92.0 | 78.6 |
| Tc (° C., 1st) | 120.9 | 120.3 | 122.0 | 122.0 | 121.7 | 121.9 | 121.6 | 123.2 | 123.3 | 122.9 | 123.3 | 122.5 |
| $_\Delta$Hc (J/g, 1st) | 94.0 | 81.3 | 101.0 | 97.8 | 95.2 | 90.9 | 81.6 | 101.2 | 97.9 | 93.6 | 92.9 | 83.5 |
| Tm (° C., 2nd) | 153.5 | 153.2 | 154.0 | 153.9 | 154.3 | 154.0 | 159.5 | 153.9 | 153.8 | 153.9 | 153.5 | 153.3 |
| $_\Delta$Hm (J/g, 2nd) | 99.7 | 86.4 | 108.9 | 105.5 | 103.2 | 96.4 | 85.2 | 109.2 | 103.5 | 98.4 | 100.0 | 86.0 |
| Tensile | | | | | | | | | | | | |
| stress @ yield (psi) | 4430 | 3270 | 5520 | 5260 | 5000 | 4400 | 3180 | 5620 | 5250 | 5000 | 4370 | 3140 |
| strain @ yield (%) | 8.1 | 9.3 | 6.6 | 7.4 | 7.4 | 8.1 | 9.6 | 7.5 | 7.9 | 7.7 | 9.2 | 9.6 |
| break stress (psi) | 1810 | 3510 | 2950 | 2640 | 2250 | 1600 | 3470 | 3520 | 2510 | 2230 | 2180 | 3540 |
| break strain (%) | 240 | 1000 | 170 | 200 | 200 | 230 | 990 | 190 | 240 | 240 | 340 | 1000 |
| Y. mod. (MPa) | 1910 | 1360 | 2470 | 2180 | 2050 | 1840 | 1340 | 2360 | 2230 | 2120 | 1870 | 1380 |
| Flex | | | | | | | | | | | | |
| tan. mod. (kpsi) | 221 | 147 | 283 | 267 | 251 | 220 | 150 | 274 | 259 | 246 | 220 | 147 |
| mod. sec. 1% (kpsi) | 213 | 142 | 272 | 256 | 240 | 212 | 145 | 264 | 250 | 238 | 210 | 142 |
| Gardner Impact (−29° C.)* | | | | | | | | | | | | |
| energy (in · lb) | <8 | 290.0 | <8 | <9 | <9 | 12.0 | 289.3 | <8 | <8 | <8 | 12.0 | 290 |
| type of failure | 5s | 13d | 3s, 10b | 3s, 10b | 3s, 10b | 9d, 2d/b | 1s, 12d | 3s, 10b | 3s, 10b | 3s, 10b | 3s, 10b | 12d |
| Notched Izod Test, Resilience (ft-lb/inch) | | | | | | | | | | | | |
| [23° C.] | 1.82 | 9.83 | 0.63 | 0.76 | 1.14 | 1.92 | 9.96 | 0.65 | 0.78 | 1.08 | 2.07 | 8.26 |
| [−18° C.] | 0.38 | 0.76 | 0.37 | 0.38 | 0.36 | 0.40 | 0.79 | 0.36 | 0.38 | 0.36 | 0.40 | 0.74 |
| [−29° C.] | 0.38 | 0.74 | 0.36 | 0.38 | 0.38 | 0.40 | 0.69 | 0.37 | 0.35 | 0.36 | 0.37 | 0.73 |

*The type of failure in Gardner Impact Test includes shatter(s), ductile(d), brittle(b), ductile/brittle(d/b). For example, 5a means 5 specimen were shattered upon impact.

ix. Films

The propylene/1,9-decadiene copolymer of Example 3 (10 MFR) was evaluated in a film forming operation, both neat and in blends with Comparative Example 16 (12 MFR). Pellets of the above invention polymer were prepared on a Warner-Pfleiderer twin screw compounding extruder (ZSK 57; twin co-rotating screws 57 mm diameter). Four compositions (neat Example 3; blends of 10, 20 and 40% Example 3 with Comparative Example 16) were prepared via melt homogenization on the compounding extruder. Prior to melt compounding, the following additive package was dry blended into each sample: 700 ppm Irganox 1010, 700 ppm Irgafos 168 (both from Ciba Geigy Corp), 300 ppm DHT-4A neutralizing agent (Kyowa Chemical Industries Co., LTD,), 750 ppm Silton JC-30 antiblock agent (International Resources, Inc.), 1500 ppm Erucamide slip agent and 500 ppm Oleamide slip agent (both from Witco Chemical).

In addition, neat Comparative Examples 12 and 16 and commercial (from ExxonMobil Chemical, Houston, Tex.) propylene polymers PD 4443 (7.3 MFR) and ACHIEVE™ 3854 (24 MFR) were also fabricated into film. All of these polymers contain the additive package referenced above, except for the ACHIEVE 3854.

Film forming was conducted on a Killion mini cast coex film line. The line has three 24:1 L/D extruders ("A" extruder at 1 in diameter; "B" and "C" extruders at 0.75 in diameter), which feed polymer into a feedblock. For these monolayer films, only the "A" extruder was used. The feedblock diverts molten polymer from each extruder to specific channels. The combined streams enter an 8 in wide Cloeren die. Molten polymer exits the die and is cast onto a chill roll (8 in diameter; 10 in roll face). The casting unit system is of adjustable speed, to obtain film of the desired thickness. Temperature profiles were set to obtain a melt temperature of 216° C. for Comparative Example 12 and ACHIEVE 3854 (both—20 MFR) and 240° C. for the other, lower MFR samples. The extruder speed was about 110 rpm and the chill roll temperature was set at 24° C. The line speed was adjusted to provide films of 1.5 mil gauge. The films were aged for a period of 2 weeks following fabrication and tested for a variety of film mechanical properties: tensile strength, elongation and 1% secant modulus (ASTM D-882); Elmendorf tear strength (ASTM D-1922); peak puncture force (ASTM D-3420) and total energy impact (ASTM D-4272-90) at ambient temperature. Film property data from these tests are shown in Table 12 below.

TABLE 12

Properties of Cast Films

| Properties | 3854 | 4443 | Comp Ex 12 | Comp Ex 16 | Example 3 | 20% Ex 3 in Ex 16 |
|---|---|---|---|---|---|---|
| MFR (dg/min) | 24 | 7.3 | 20 | 12 | 10 | 12 |
| Av Thickness (mil) | 1.62 | 1.45 | 1.48 | 1.48 | 1.66 | 1.52 |
| 1% Sec Mod (kpsi) | | | | | | |
| MD | 123 | 123 | 176 | 128 | 211 | 171 |
| TD | 114 | 121 | 165 | 129 | 181 | 164 |
| Ult Tensile Str (psi) | | | | | | |
| MD | 7820 | 10530 | 7658 | 8980 | 5570 | 8700 |
| TD | 8470 | 8110 | 8324 | 8230 | 4480 | 7650 |

TABLE 12-continued

Properties of Cast Films

| Properties | 3854 | 4443 | Comp Ex 12 | Comp Ex 16 | Example 3 | 20% Ex 3 in Ex 16 |
|---|---|---|---|---|---|---|
| Ult Elongation (%) | | | | | | |
| MD | 640 | 710 | 690 | 685 | 335 | 700 |
| TD | 700 | 720 | 750 | 725 | <20 | 720 |
| ElmendorfTear (g/mil) | | | | | | |
| MD | 40 | 28 | 16 | 42 | 5 | 15 |
| TD | 45 | 68 | 20 | 58 | 9 | 23 |
| Puncture Force (lb/mil) | 8.5 | 6.5 | 5.5 | 5.0 | 6.0 | 7.0 |
| Total Energy (in.lb force) | 5.6 | 4.3 | 1.4 | 5.7 | 0.7 | 1.3 |

Note. Gels in film of Example 3 act as weak links, causing low strength values during high speed testing (such as Elmendorf tear and Total energy impact): lower speed tests (such as Puncture) are not influenced The invention polymer shows higher ambient temperature stiffness than the comparative polymers. Film toughness at lower testing speeds (e.g. puncture force) is comparable to the controls. At higher testing speeds (e.g. Elmendorf tear), lower toughness values are obtained.

Figure 13:
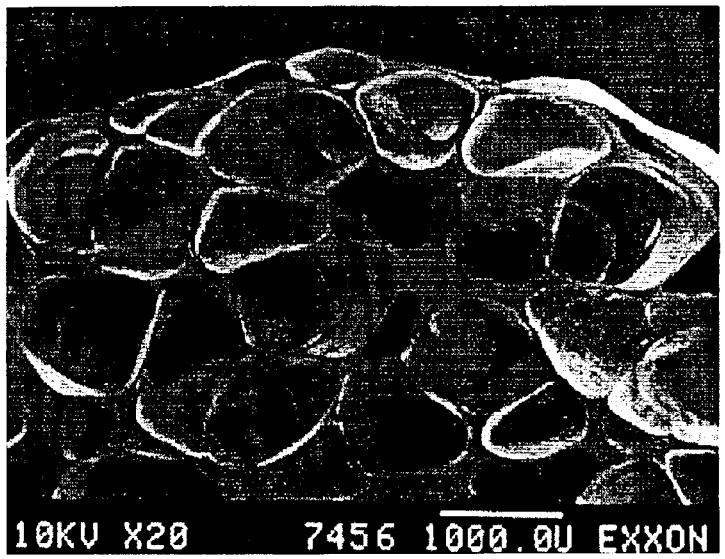
FIG. 13 shows micrographs of the cellular morphologies of foamed profiles from Example 4 and comparative resin PF-814 (commercial product from Montell), using carbon dioxide gas injection.
Figure 13:
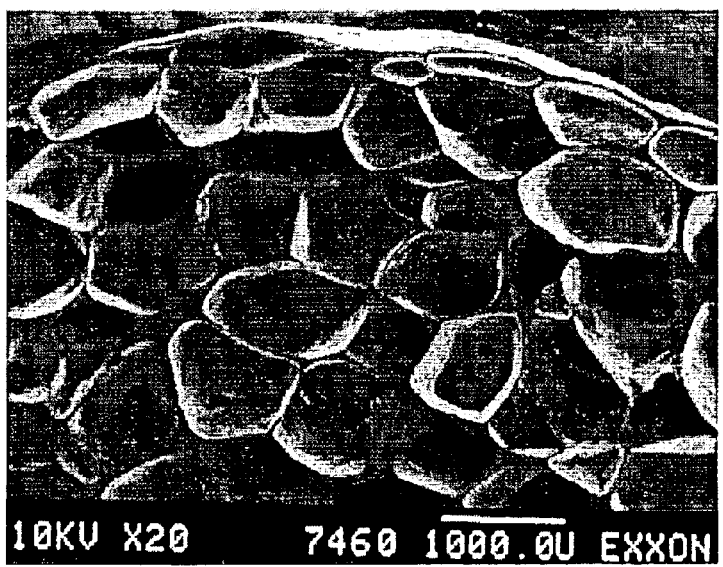
Figure 14:
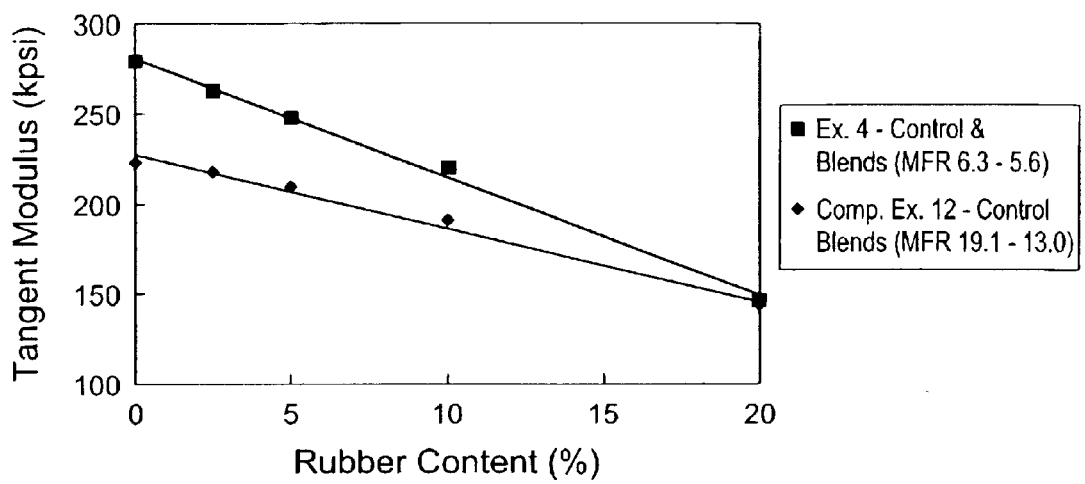
FIG. 14 plots molded part properties for TPO blend compositions derived from Examples 3, 4, 5, 7 and Comparative Example 12. The TPO compositions involved blends with VISTALON™ 457 EP rubber.
Figure 14:
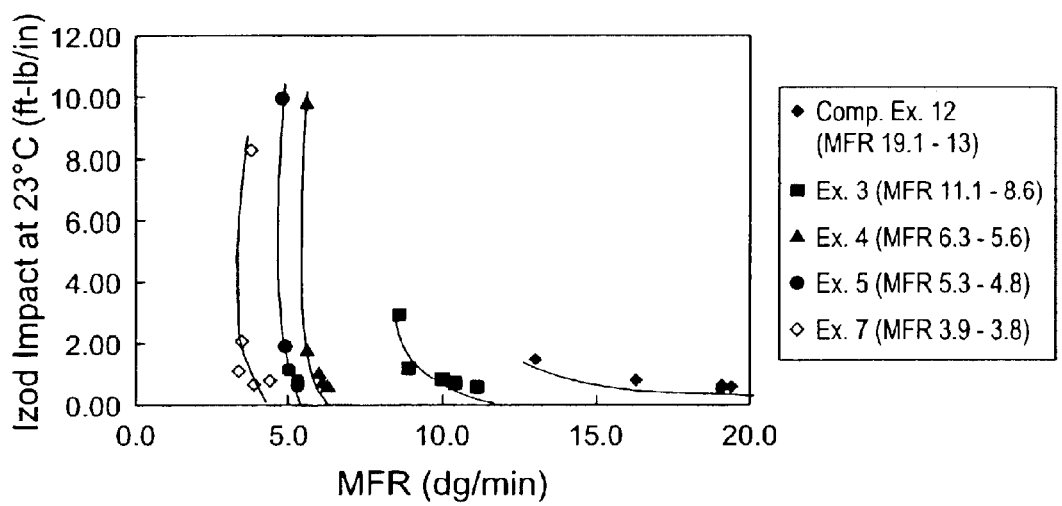
Figure 14:
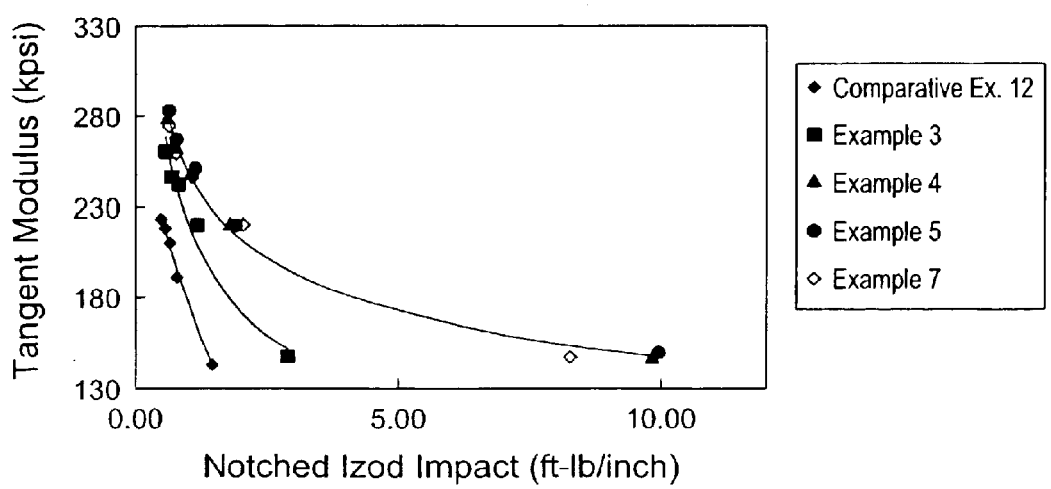
Figure 15:
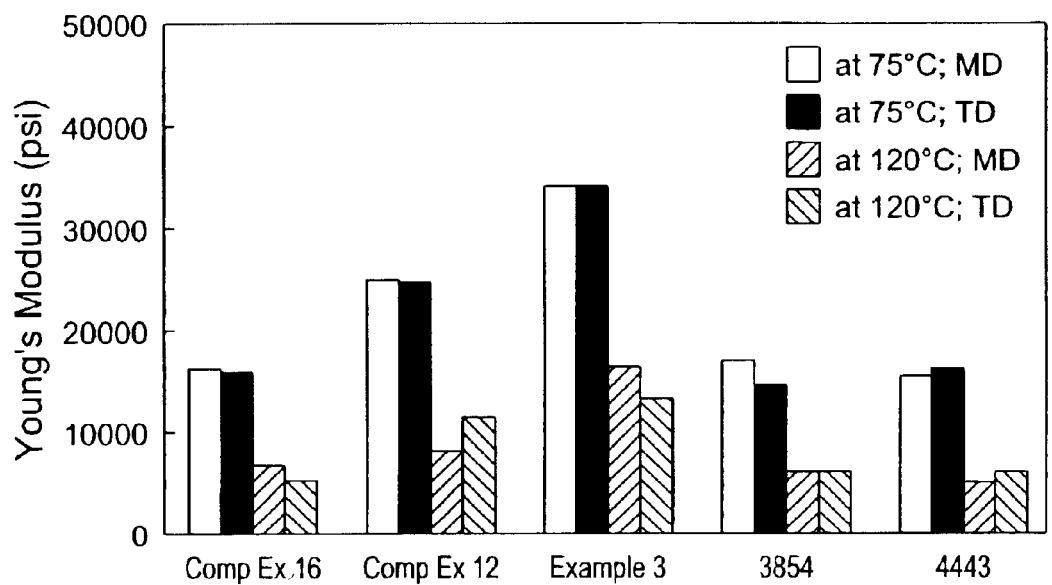
FIG. 15 plots film stiffness at elevated temperatures (75° C. and 120° C.) for cast films from Example 3 (neat and in blends with Comp Example 16), Comparative Examples 12 and 16, and commercially available comparatives PP4443 and ACHIEVE™ 3854.
Figure 15:
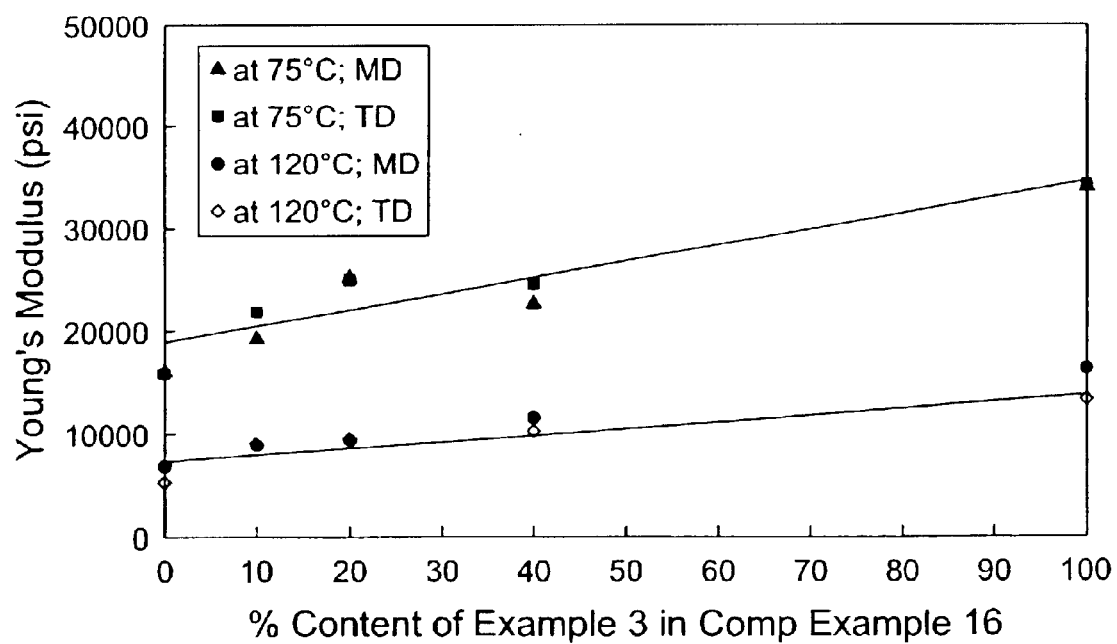
Figure 16:
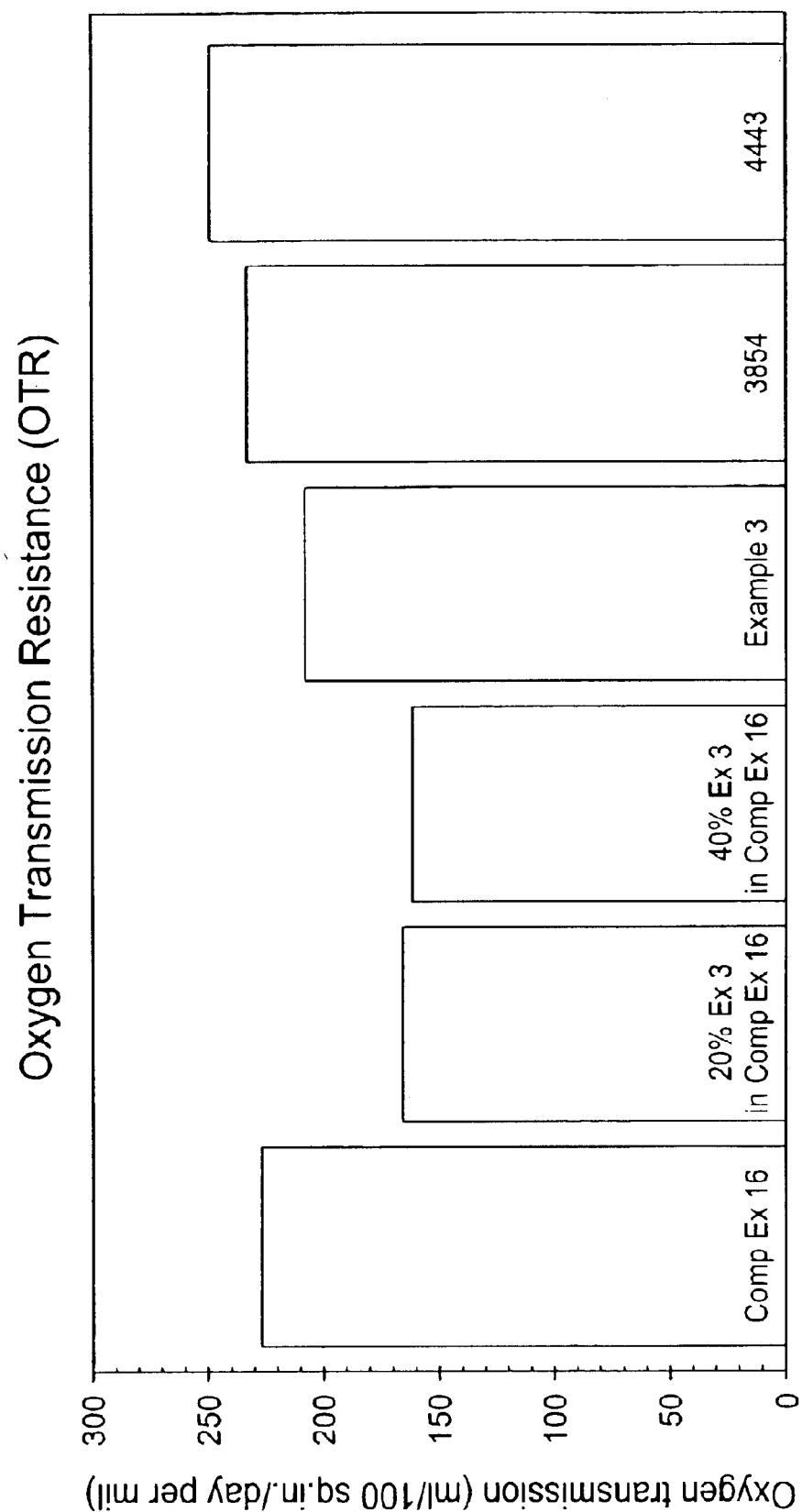
FIGS. 17 & 16 plots film barrier properties (water vapor transmission resistance and oxygen transmission resistance) for cast films from invention Example 3 (neat and in blends with linear Comparative Example 16), Comparative Examples 12 and 16, and commercially available comparative resins PP4443 and ACHIEVE™ 3854.
Figure 17:
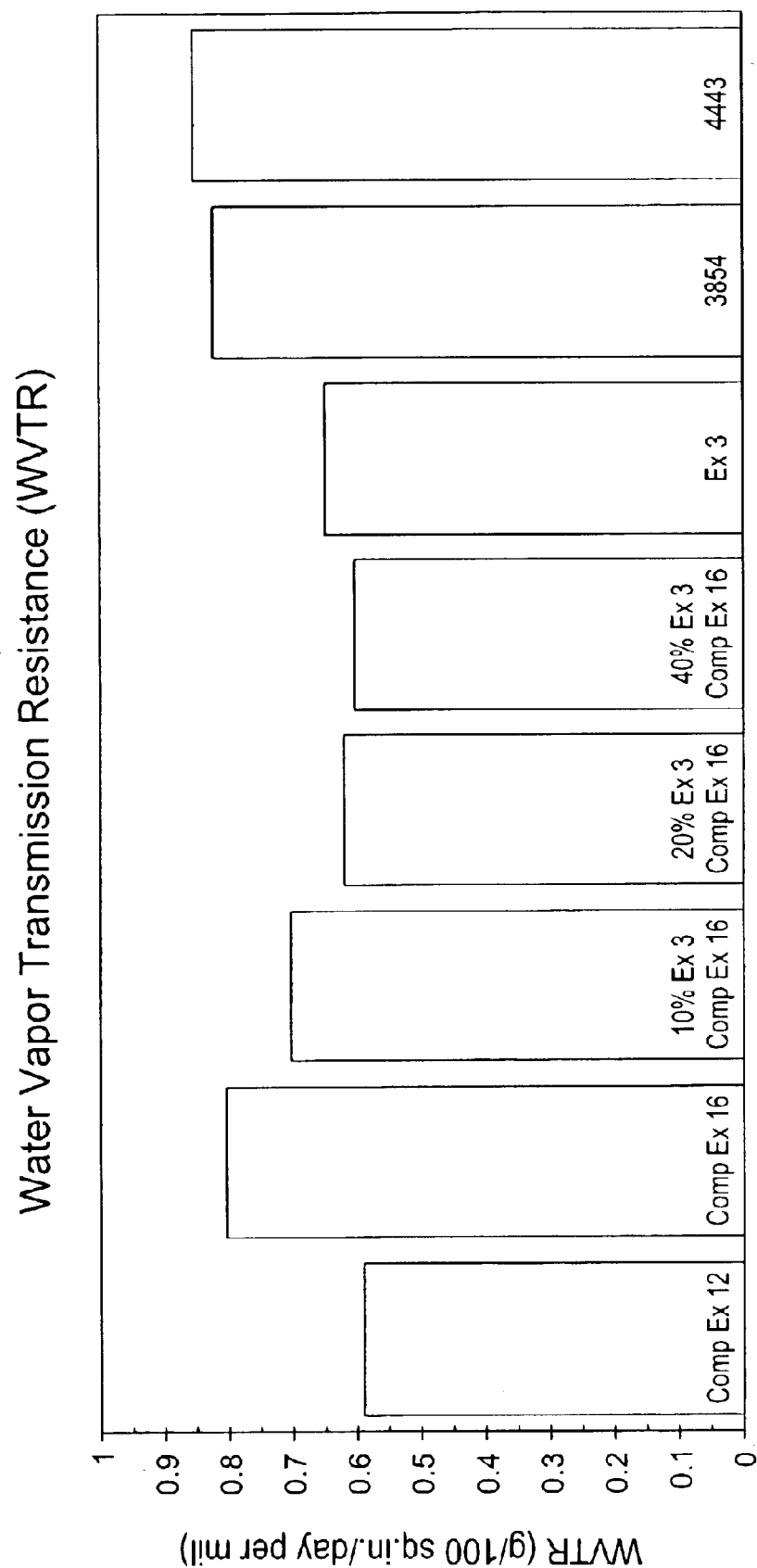
Figure 18:
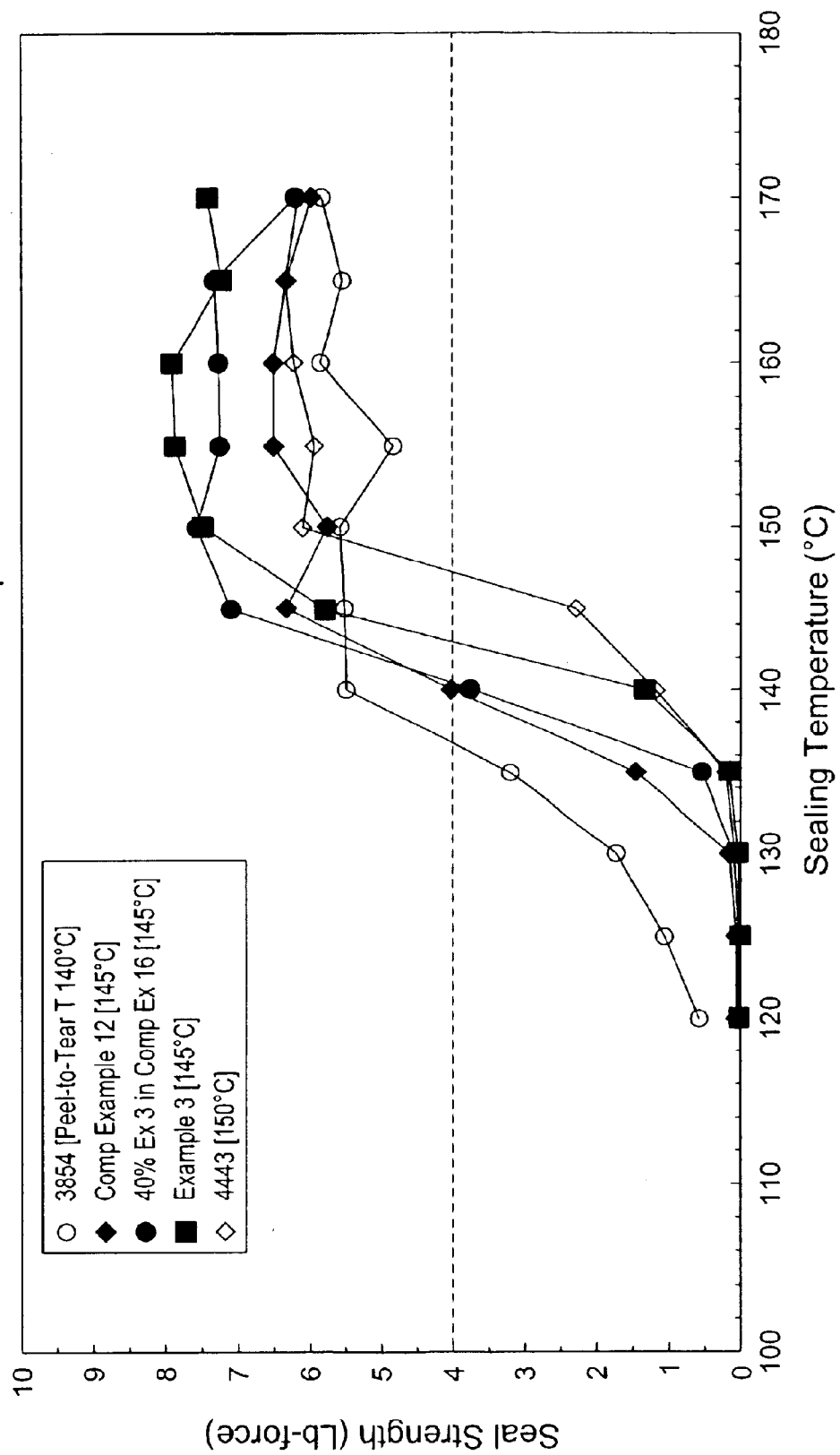
FIG. 18 plots film heat seal behavior (seal strength) versus sealing temperature for cast films from Example 3 (neat and in blends with Comparative Example 16), Comparative Example 12, and commercially available resins PP4443 and ACHIEVE™ 3854.

The higher film stiffness obtained at ambient temperature carries over to elevated temperature testing (at 75° C. and 120° C. along the machine direction, MD, and transverse direction, TD), as is shown in FIG. 13. The barrier properties of water vapor transmission resistance (WVTR; ASTM F-372) and oxygen transmission resistance (OTR; ASTM D-1434) are the best for the invention polymers. This is shown in FIG. 14. There are indications of improved barrier for the blend films over the individual component films. In FIG. 15, the sealing performances of the films are shown. Heat seal testing involved films sealed on a Theller film sealer (Model PC) and tested for seal strength on a United six-station tensile testing machine. Sealing conditions were: 30 psi seal pressure; 0.5 sec dwell time; 5 in×⅜ in seal bar dimensions. Seal testing conditions were: 4 in long and 1 in wide strips; 3 test specimens per sample; 20 in/min test speed. The data in FIG. 15 show the seal initiation temperature (SIT; temperature at 4 lb seal force) value for the invention polymer Example 3 (neat and blend) to be in between the values for the metallocene and conventional Ziegler-Natta linear controls (3854 and 4443 respectively). Of note is the observation that the invention films (neat and blend) show the highest levels for ultimate seal strength, which characterizes the strength of the film heat seals.

Based on the observed film properties above, potential film applications for the invention polymers include i) the addition of invention polymers to standard linear polypropylenes (oriented and non-oriented films) to render enhancements in barrier properties and stiffness, while maintaining good processability. Higher film stiffness and barrier are always of interest to polypropylene film producers, ii) packaging applications requiring the unique combination of high stiffness, high barrier and easy package openability (e.g. candy wrappers, wrappers for dishwasher detergent cubes, other film packaging applications requiring paper-like easy openability), iii) laminations or coextrusions to provide films with inherently higher stiffness and barrier properties, and iv) film down-gauging, based on the inherent enhancements in stiffness and barrier.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordant dance with U.S. patent practice, each of the features in any of the appendant claims can be combined with each of the features of other appendant claims or the main claim.

What is claimed is:

1. An article comprising copolymer comprising from 90 to 99.999 weight percent of olefin units, from 0.001 to 2.000 weight percent of α,ω-diene units, wherein the copolymer has a weight average molecular weight in the range from 50,000 to 2,000,000, a melt flow rate in the range from 0.1 dg/min to 100 dg/min, and the copolymer has a first melting point in a first melting point range and a second melting point in a second melting point range and wherein the first melting point range is distinguishable from the second melting point range by a temperature range of from 1° C. to 8° C.

2. The article of claim 1 wherein the weight percent of α,ω-diene units present in the copolymer is from 0.005 to 1.5.

3. The article of claim 1 wherein the weight percent of α,ω-diene units present in the copolymer is from 0.005 to 1.0.

4. The article of claim 1 wherein the article is a film, fibers, fabric, molded article, and/or foamed article.

5. The article of claim 1 wherein the article is a bottle, cast film, oriented film, injection molded article, blow molded article, foam laminate, thermoformed article, and/or automotive article.

6. The article of claim 1 wherein the copolymer comprises from 90 to 99.999 weight percent of olefin units, from 0.001 to 2.000 weight percent of α,ω-diene units and from 0.1 to 8.0 weight % of a comonomer selected from the group consisting of ethylene, $C_4$–$C_{10}$ α-olefins, diolefins, that are not α,ω-diene units and mixtures thereof.

7. The article of claim 6 wherein the comonomer comprises one or more of ethylene, butene-1, pentene-1, hexene-1, heptene-1,4-methyl-1-pentene, 3-metliyl-1-pentene, 4-methyl-1-hexene, 5-methyl-1-hexene, 1-octene, 1-decene, 1-undecene, and 1-dodecene.

8. The article of claim 1 wherein the copolymer has
a weight average molecular weight in the range from 70,000 to 1,000,000;
a crystallization temperature in the range from 118° C. to 130° C.;
a melting point less than 160° C.;
a hexane extractable level of the copolymer of less than 1.0 wt %; and
a ratio of extensional viscosity at break to linear viscosity of at least 3.0.

9. The article of claim 1 wherein the article is a fiber or a fabric.

10. An article comprising a skin layer having a thickness in a range of from 10 μm to 120 μm, formed from a copolymer comprising: from 90 to 99.999 weight percent of propylene units; from 0.00 to 8 weight percent of olefin units other than propylene units; and from 0.001 to 2.000 weight percent of α,ω-diene units, and wherein the copolymer has: 1) a weight average molecular weight in a range from 50,000 to 2,000,000; 2) a crystallization temperature in a range from 118° C. to 135° C.; and 3) a melt flow rate in a range from 0.1 dg/min to 100 dg/min.

11. The article of claim 10 wherein skin layer thickness is in a range from 30 μm to 100 μm.

12. The article of claim 10 wherein the copolymer has a first melting point in a first melting point range and a second melting point in a second melting point range and wherein the first melting point range is distinguishable from the second melting point range by a temperature range of from 1° C. to 16° C.

13. The article of claim 10 where the skin layer is present on a film, fiber, fabric, molded article, and/or foamed article.

14. The article of claim 10 where the skin layer is present on a bottle, cast film, oriented film, injection molded article, blow molded article, foam laminate, thermoformed article, and/or automotive article.

15. The article of claim 10 wherein the olefin is selected from a group consisting of ethylene, $C_4$–$C_{10}$ α-olefins, diolefins and mixtures thereof.

16. The article of claim 10 wherein the olefin is selected from a group consisting of ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene.

17. The article of claim 10 wherein the crystallization temperature of the copolymer is in a range from grater than 118° C. to 130°°C.

18. An article comprising a copolymer comprising from 90 to 99.9 weight % propylene, 0.1 to 8 weight % of ethylene or a C4 to C20 alpha-olefin, a C4 to C20 diolefin having an internal olefin, and 0.0001 to 2 weight % of an alpha, omega-diene, wherein the copolymer has an MFR of from 0.1 to 50 dg/min, an Mw of from 50,000 to 2,000,000 and two melting points, one melting point in the range of from 152 to 158° C. and the second melting point in the range of from 142 to 148° C.

19. The article of claim 18 wherein the diene is selected from the group consisting of 1,6-heptadiene, 1,7-octadiene, 1,8 nonadiene, 1,9-decadiene, 1,10-undecadiene, 1,11-dodecadiene, 1,12-tridecadiene, and 1,13-tetradecadiene.

20. An article comprising copolymer comprising from 90 to 99.999 weight percent of olefin units, from 0.001 to 2.000 weight percent of α,ω-diene units, wherein the copolymer has a weight average molecular weight in the range from 50,000 to 2,000,000, a melt flow rate in the range from 0.1 dg/min to 100 dg/min, and the melting temperature of the copolymer minus the crystallization temperature of the polymer is in the range of from 25° C. to 390° C.

21. The article of claim 20 wherein the weight percent of α,ω-diene units present in the copolymer is from 0.005 to 1.5.

22. The article of claim 20 wherein the weight percent of α,ω-diene units present in the copolymer is from 0.005 to 10.

23. The article of claim 20 wherein the article is a film, fibers, fabric, molded article, and/or foamed article.

24. The article of claim 20 wherein the article is a bottle, cast film, oriented film, injection molded article, blow molded article, foam laminate, thermoformed article, and/or automotive article.

25. The article of claim 20 wherein the copolymer comprises from 90 to 99.999 weight percent of olefin units, from 0.001 to 2.000 weight percent of α,ω-diene units and from 0.1 to 8.0 weight % of a comonomer selected from the group consisting of ethylene, $C_4$–$C_{10}$ α-olefins, diolefins, that are not α,ω-diene units and mixtures thereof.

26. The article of claim 25 wherein the comonomer comprises one or more of ethylene, butene-1, pentene-1, hexene-1, heptene-1,4-methyl-1-pentene, 3-methyl-1- pentene, 4-methyl-1-hexene, 5-methyl-1-hexene, 1-octene, 1-decene, 1-undecene, and 1-dodecene.

27. The article of claim 20 wherein the article is a fiber or a fabric.

28. An article comprising a skin layer having a thickness in a range of from 10 µm to 120 µm, formed from a copolymer comprising: from 90 to 99.999 weight percent of propylene units; from 0.00 to 8 weight percent of olefin units other than propylene units; and from 0.001 to 2.000 weight percent of α,ω-diene units, and wherein the copolymer has: 1) a weight average molecular weight in a range from 50,000 to 2,000,000; 2) a crystallization temperature in a range from 118° C. to 135° C.; and 3) a melt flow rate in a range from 0.1 dg/min to 100 dg/min.

29. The article of claim 28 wherein skin layer thickness is in a range from 30 µm to 100 µm.

30. The article of claim 28 wherein the copolymer has a first melting point in a first melting point range and a second melting point in a second melting point range and wherein the first melting point range is distinguishable from the second melting point range by a temperature range of from 1° C. to 16° C.

31. The article of claim 28 where the skin layer is present on a film, fiber, fabric, molded article, and/or foamed article.

32. The article of claim 28 where the skin layer is present on a bottle, cast film, oriented film, injection molded article, blow molded article, foam laminate, thermoformed article, and/or automotive article.

33. The article of claim 28 wherein the olefin is selected from a group consisting of ethylene, $C_4$–$C_{10}$ α-olefins, diolefins and mixtures thereof.

34. The article of claim 28 wherein the olefin is selected from a group consisting of ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene.

35. The article of claim 28 wherein the crystallization temperature of the copolymer is in a range from greater than 118° C. to 130° C.

36. An article comprising a copolymer comprising from 90 to 99.9 weight % propylene, 0.1 to 8 weight % of ethylene or a C4 to C20 alpha-olefin, a C4 to C20 diolefin having an internal olefin, and 0.0001 to 2 weight % of an alpha, omega-diene, wherein the copolymer has an NER of from 0.1 to 50 dg/min, an Mw of from 50,000 to 2,000,000 and two melting points, one melting point in the range of from 152 to 158° C. and the second melting point in the range of from 142 to 148° C.

37. The article of claim 36 wherein the diene is selected from the group consisting of 1,6-heptadiene, 1,7-octadiene, 1,8 nonadiene, 1,9-decadiene, 1,10-undecadiene, 1,11-dodecadiene, 1,12-tridecadiene, and 1,13-tetradecadiene.

38. An article comprising a copolymer comprising from 90 to 99.9 weight % propylene, 0.1 to 8 weight % of one or more of ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene, and 0.0001 to 2 weight % of one or more alpha, omega-diene selected from the group consisting of 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene, wherein the copolymer has an MFR of from 0.1 to 50 dg/min, an Mw of from 50,000 to 1,000,000 and two melting points, one melting point in the range of from 152 to 158° C. and the second melting point in the range of from 142 to 148° C.

39. The article of claim 38, wherein the article fiber comprises one or more additives selected from the group consisting of heat stabilizers, antioxidants, neutralizers, slip agents, antiblock agents, pigments, antifogging agents, antistatic agents, clarifiers, nucleating agents, ultraviolet absorbers, light stabilizers, fillers, hydrocarbon resins, rosins or rosin esters, waxes, and plasticizers.

40. An article comprising copolymer comprising from 90 to 99.999 weight percent of olefin units, from 0.001 to 2.000 weight percent of α,ω-diene units, wherein the copolymer has a weight average molecular weight in the range from 50,000 to 2,000,000, a melt flow rate in the range from 0.1 dg/min to 100 dg/min, and the copolymer has a first melting point in the range of 152 to 158° C. and a second melting point in the range of 142° C. to 148° C.

41. The article of claim 40 wherein the weight percent of α,ω-diene units present in the copolymer is from 0.005 to 1.5.

42. The article of claim 40 wherein the weight percent of α,ω-diene units present in the copolymer is from 0.005 to 1.0.

43. The article of claim 40 wherein the article is a film, fibers, fabric, molded article, and/or foamed article.

44. The article of claim 40 wherein the article is a bottle, cast film, oriented film, injection molded article, blow molded article, foam laminate, thermoformed article, and/or automotive article.

45. The article of claim 40 wherein the copolymer comprises from 90 to 99.999 weight percent of olefin units, from 0.001 to 2.000 weight percent of α,ω-diene units and from 0.1 to 8.0 weight % of a comonomer selected from the group consisting of ethylene, $C_4$–$C_{10}$ α-olefins, diolefins, that are not α,ω-diene units and mixtures hereof.

46. The article of claim 45 wherein the comonomer comprises one or more of ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene.

47. The article of claim 40 wherein the article is a fiber or a fabric.

48. An article formed from a propylene copolymer, said copolymer comprising:
   a) propylene;
   b) olefin units other than propylene;
   c) α, ω diene units;
   wherein said propylene copolymer has:
      a weight average molecular weight in the range from 50,000 to 2,000,000;
      a crystallization temperature in the range from 118° C. to 135° C.;
      a melt flow rate in the range from 0.1 dg/min to 100 dg/min;
      a melting point less than 165° C.;
      a hexane extractable level (as measured by 21 CFR 177.1520(d)(3)(i)) of the copolymer of less than 2.0 wt %;
      a ratio of extensional viscosity at break to linear viscosity of at least 2.5 at strain rates from 0.1 second$^{-1}$ to 1.0 second$^{-1}$; and
      a recoverable compliance in the range of from 7 to 42 cm$^2$/dyne.

49. The article of claim 48, wherein said article optionally further comprises a blend of said propylene copolymer and one of a reactor blend with linear polypropylene, or homogenized blends of said propylene copolymer and one of ethylene-based plastomers, propylene-based plastomers, ethylene-based elastomers, or propylene-based elastomers.

50. The article of claim 48, wherein said olefin units other than propylene are selected from one of ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, or 1-dodecene;

wherein said α, ω diene is selected from one of 1,6-heptadiene, 1,7-octadiene, 1,8 nonadiene, 1,9-decadiene, 1,10-undecadiene, 1,11-dodecadiene, 1,12-tridecadiene, and 1,13-tetradecadiene;

wherein said copolymer has:
a weight average molecular weight in the range from 70,000 to 1,000,000;
a crystallization temperature in the range from 118° C. to 130° C.;
a melting point less than 160° C.;
a hexane extractable level of the copolymer of less than 1.0 wt %, and
a ratio of extensional viscosity at break to linear viscosity of at least 3.0.

51. The article of claim 48, wherein said olefin other than propylene, is ethylene, said α, ω diene is selected from one of 1,7-octadiene, or 1,9-decadiene;

wherein said copolymer has:
a weight average, molecular weight in the range from 100,000 to 750,000;
a crystallization temperature in the range from 118° C. to 126° C.;
a melting point less than 160° C.;
a hexane extractable level of the copolymer of less than 1.0 wt %; and
a ratio of extensional viscosity at break to linear viscosity of at least 3.5.

52. The article of claim 48, wherein said olefin other than propylene is ethylene, said α, ω diene is 1,9-decadiene;

wherein said copolymer has:
a weight average molecular weight in the range from 100,000 to 750,000;
at least two crystalline populations wherein the melting point ranges for one crystalline population arc distinguishable from the melting point range of another crystalline population by a melting point range from 1° C. to 16° C.;
a melting point less than 160° C.;
a hexane extractable level of the copolymer of less than 1.0 wt %; and
a ratio of extensional viscosity at break to linear viscosity of at least 3.5.

53. The article of claim 52, wherein in said copolymer has at least two crystalline populations, one of said crystalline populations has a melting point from 152° C. to 158° C. and another said crystalline population has a melting point from 142° C. to 148° C.

54. The article of claim 53, wherein said article is one of films, fabrics, fibers, molded articles, or foamed articles.

55. The article of claim 53, wherein said article is one of cast films, bottles, oriented films, injection molded articles, or automotive articles.

56. The article of claim 55, wherein said automotive articles are selected from one of automotive interior, automotive exterior trims, bumpers, side panels, floor mats, dashboards and instrument panels.

57. The article of claim 54, wherein said foamed articles are selected from one of heat insulation, sound insulation, industrial appliances, home appliances, packaging, automotive bumper guards, automotive dashboards or automotive interior liners.

58. The article of claim 54, wherein said fibers or fabrics are selected from one of spunbonded fibers, meltblown fibers, or non-woven fabrics.

59. The article of claim 53 wherein said article is a thermoformed part.

60. An article, comprising a propylene copolymer, said propylene copolymer comprising propylene and 1,9-decadiene, and said copolymer having:
a weight average molecular weight in the range from 100,000 to 750,000;
a melt flow rate in the range from 1 dg/min to 35 dg/min;
a crystallization temperature in the range from 118° C. to 126° C.;
a melting point selected from one of less than 160° C., or at least two crystalline populations wherein the melting point ranges for one crystalline population are distinguishable from the melting point range of another crystalline population by a melting point range from 1° C. to 8° C., wherein in said at least two crystalline populations one of said crystalline populations has a melting point from 152° C. to 158° C. and another said crystalline population has a melting point from 142° C. to 148° C.;
a hexane extractable level (as measured by 21 CFR 177.1520(d)(3)(i)) of the copolymer of less than 1.0 wt %; and
a ratio of extensional viscosity at break to linear viscosity of at least 3.5 at stain rates from 0.1 second$^{-1}$ to 1.0 second$^{-1}$; and,
a recoverable compliance in the range of from 7 to 42 (x $10^{-5}$) cm$^2$/dyne.

61. An article formed from a propylene copolymer, said propylene copolymer comprising:
a) from 90 to 99.995 weight percent propylene;
b) from 0.005 to 0.0375 weight percent of an α,ω diene selected from one of 1,7-octadiene or 1,9-decadiene, wherein said copolymer has:
a weight average molecular weight in the range from 100,000 to 750,000;
a melt flow rate in the range from 1 dg/min to 35 dg/min;
a crystallization temperature in the range from 118° C. to 126° C.;
a melting point of less than 160° C.; and
a recoverable compliance in the range of from 7 to 17 (x $10^{-5}$) cm$^2$/dyne.

62. The article of claim 61, wherein said article is one of films, fabrics, fibers, molded articles, or foamed articles.

* * * * *